US011332315B2

(12) United States Patent
Andreoli et al.

(10) Patent No.: US 11,332,315 B2
(45) Date of Patent: May 17, 2022

(54) LINK FOR A CHAIN FOR AN ARTICLE CONVEYOR

(71) Applicant: REXNORD FLATTOP EUROPE S.R.L., Correggio (IT)

(72) Inventors: Andrea Andreoli, Modena (IT); Antonino Fiore, Correggio (IT); Davide Calciolari, Correggio (IT)

(73) Assignee: REXNORD FLATTOP EUROPE S.R.L., Correggio (IT)

( * ) Notice: Subject to any disclaimer, the term of this patent is extended or adjusted under 35 U.S.C. 154(b) by 0 days.

(21) Appl. No.: 17/260,377

(22) PCT Filed: Sep. 20, 2019

(86) PCT No.: PCT/EP2019/075408
§ 371 (c)(1),
(2) Date: Jan. 14, 2021

(87) PCT Pub. No.: WO2020/058506
PCT Pub. Date: Mar. 26, 2020

(65) Prior Publication Data
US 2021/0261344 A1 Aug. 26, 2021

(30) Foreign Application Priority Data
Sep. 21, 2018 (IT) .......................... 102018000008804

(51) Int. Cl.
*B65G 17/06* (2006.01)
*B65G 17/42* (2006.01)

(52) U.S. Cl.
CPC ........... *B65G 17/065* (2013.01); *B65G 17/42* (2013.01)

(58) Field of Classification Search
CPC ...... B65G 17/44; B65G 17/42; B65G 17/065; B65G 17/066; B65G 17/067; B65G 17/068; B65G 17/08; B65G 17/086
See application file for complete search history.

(56) References Cited

U.S. PATENT DOCUMENTS 1,354,553 A 10/1920 Harter
2,621,779 A 12/1952 Harter
(Continued)

FOREIGN PATENT DOCUMENTS

JP S59179806 U 12/1984
KR 101561435 B1 10/2015
(Continued)

OTHER PUBLICATIONS

PCT International Search Report and Written Opinion, PCT/EP2019/075408, dated Dec. 10, 2019, 10 pages.
(Continued)

*Primary Examiner* — Mark A Deuble
(74) *Attorney, Agent, or Firm* — Quarles & Brady LLP

(57) ABSTRACT

A link for a chain for an article conveyor includes first and second link elements formed as coupleable separate parts. The first link element may be configured to support articles, and the second link element may be adapted to support the first link element and to allow the chain to be moved when in use. The link includes a hinging region in the second link element for hinging the link to a further link of the chain. The hinging region may be adapted to the insertion within it of a hinging element for hinging the link to another link of the chain. The link includes confining means provided in the first link element and adapted, when the first and second link elements are coupled, to confine the hinging element within the hinging region, thereby preventing the hinging element to escape from the hinging region.

15 Claims, 13 Drawing Sheets

(56) References Cited

U.S. PATENT DOCUMENTS

| | | | |
|---|---|---|---|
| 3,045,809 A | | 7/1962 | Bechtel, Jr. |
| 3,520,398 A | | 7/1970 | Thomson |
| 3,863,754 A | | 2/1975 | Van Lake |
| 3,876,547 A | | 4/1975 | Kaess |
| 5,042,244 A | * | 8/1991 | Worsley ............... B65G 21/20 59/78 |
| 6,347,699 B1 | | 2/2002 | Ramsey |
| 6,851,549 B1 | * | 2/2005 | Beringer ............... B65G 17/44 198/803.14 |
| 6,854,590 B2 | | 2/2005 | Rudy et al. |
| 6,945,388 B2 | * | 9/2005 | Schumacher ......... B65G 17/065 198/851 |
| 7,428,694 B2 | * | 9/2008 | Pistoulet .......... G01R 31/31719 714/724 |
| 7,494,005 B2 | | 2/2009 | Messick, Jr. et al. |
| 9,061,829 B2 | | 6/2015 | Salsone et al. |
| 9,126,763 B2 | * | 9/2015 | Henrekson ............ B65G 15/48 |
| 9,290,327 B2 | * | 3/2016 | Abbestam ............. B65G 17/40 |
| 9,776,799 B2 | | 10/2017 | Ulchak et al. |
| 9,856,087 B2 | * | 1/2018 | Beesley ................ B65G 17/44 |
| 10,858,191 B2 | | 12/2020 | Messick, Jr. et al. |
| 2007/0187213 A1 | * | 8/2007 | Garbagnati .......... B65G 17/065 198/731 |
| 2009/0236203 A1 | * | 9/2009 | Stebnicki ............. B65G 17/42 198/778 |
| 2021/0053762 A1 | | 2/2021 | Messick, Jr. et al. |

FOREIGN PATENT DOCUMENTS

| | | |
|---|---|---|
| WO | 8100244 A1 | 2/1981 |
| WO | 2017202862 A1 | 11/2017 |

OTHER PUBLICATIONS

Rexnord, Fortrex 9200 Stainless Steel MatTop Chain—Pasteurizers, Warmers, Coolers, Copyright 2008 Rexnord Industries, LLC, 8 pages.

* cited by examiner

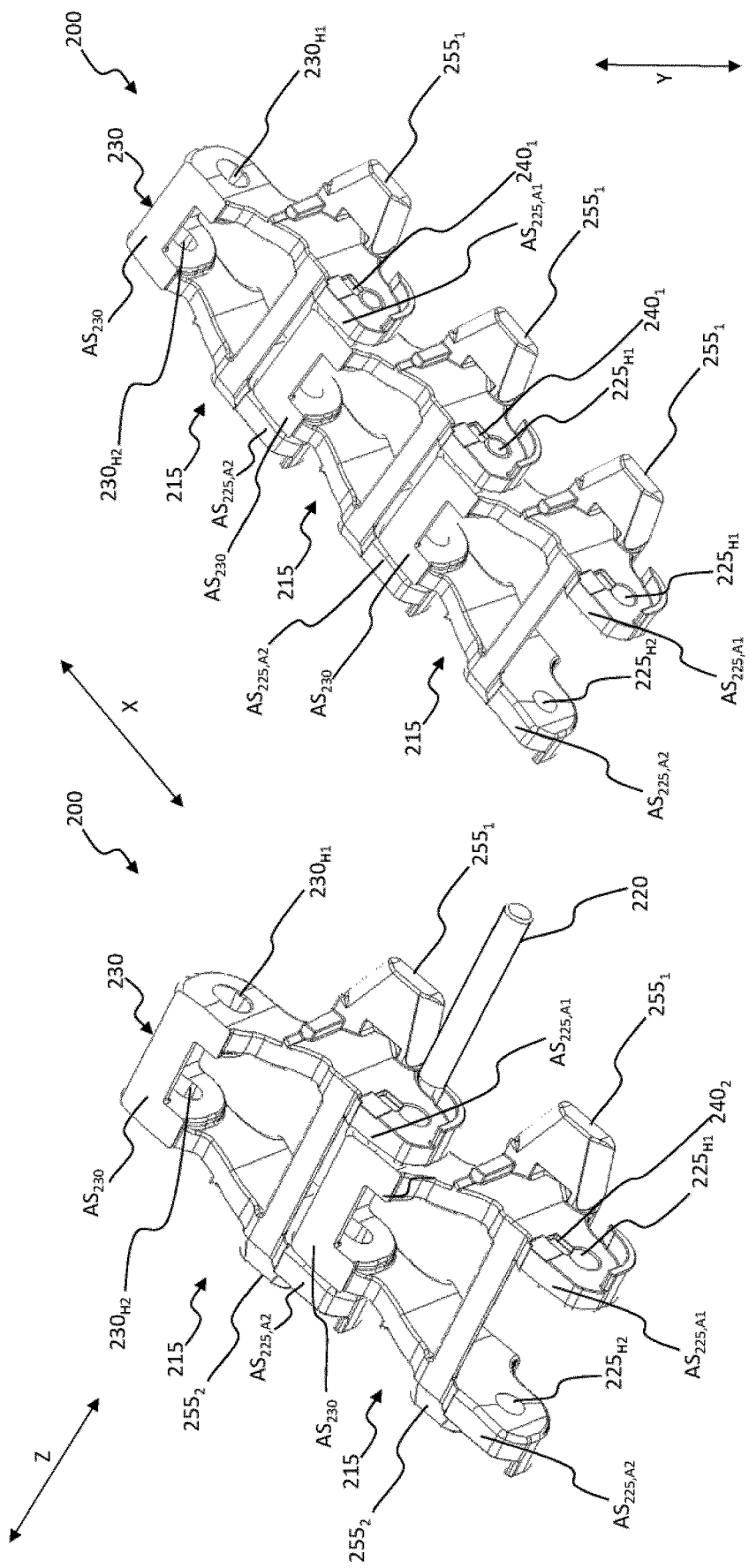

LINK FOR A CHAIN FOR AN ARTICLE CONVEYOR

CROSS-REFERENCE TO RELATED APPLICATIONS

This application represents the national stage entry of PCT International Application No. PCT/EP2019/075408 filed on Sep. 20, 2019, which claims priority to Italian Patent Application IT 102018000008804 filed on Sep. 21, 2018, each of these applications is hereby incorporated herein by reference for all purposes.

FIELD OF THE INVENTION

The present invention generally relates to article conveyors. More particularly, the present invention relates to a link for a chain for an article conveyor.

PRIOR-ART DISCUSSION

An article conveyor typically comprises a movable closed-loop support element adapted to support the articles to be conveyed, and drive elements (for example, electric motors, pinions and cogwheels) for moving the support element along a predefined path (thereby allowing the articles to be conveyed).

A very common type of conveyor makes use of a chain as support element, which typically is configured in such a way to flex/bend upward and downward (for example, so as to be moved around pinions and cogwheels), and, in some cases, to curve rightward and leftward along the path. In order to achieve it, the chain typically comprises a succession of links coupled to each other in such a way that, in correspondence of a path flexing, each link can flex with respect to the adjacent link. Each link comprises a plate and a link body for supporting the plate and for allowing the coupling between adjacent links. The plates of the different links coupled to form the chain define a support surface for the articles to be conveyed.

The coupling between two adjacent links is typically performed through pins or other hinging elements inserted into through holes provided in hinging regions of such links.

In the prior-art solution the hinging pins are inserted into the respective through holes along an insertion direction (which is typically orthogonal to a moving direction of the chain), and are held in position within the respective through holes essentially by friction or interference between the hinging pins and inner walls of the respective through holes.

SUMMARY OF THE INVENTION

The Applicant has noticed that the prior-art solutions used for obtaining the hinging between adjacent links are not satisfactory.

In particular, the Applicant has noticed that, in order to ensure that the hinging pins keep on being inserted within the respective through holes by friction, the through holes and the hinging pins should have substantially same size (i.e., with the through holes having imperceptibly greater size with respect to the hinging pins). As a result of it, the insertion/extraction operations of the hinging pins into/from the through holes cannot be easily performed manually, on the contrary they require the use of specific tools (with corresponding cost and processing time increases) and/or the application of a high force (which exposes the links to mechanical stresses potentially causing structural damages).

In addition, the Applicant has also noticed that in the prior-art solutions the friction between the hinging pins and the through holes may decrease over time, for example as a result of material wear due to continuous rubbing between the hinging pins and the through holes due to the chain movement (in particular, during flexing/bending of the chain), whereby one or more hinging pins may escape from the respective through holes along the insertion direction even after relatively short periods of use of the chain.

The Applicant has faced the above-mentioned issues and has devised a solution of link wherein the hinging pins are firmly held in position within the through holes of the hinging regions of the links by confinement, along the insertion direction, of the hinging pins within the respective through holes (with insertion and extraction of the hinging pins within the through holes that may therefore be performed substantially with no friction or with reduced friction).

In particular, one or more aspects of the present invention are indicated in the independent claims, with advantageous features of the same invention that are indicated in the dependent claims, whose text is incorporated herein verbatim by reference (with any advantageous feature provided with reference to a specific aspect of the present invention that applies mutatis mutandis to any other aspect thereof).

More specifically, an aspect of the present invention relates to a link for a chain for an article conveyor. Said link preferably comprises a first link element and a second link element formed as coupleable separate parts. The first link element is preferably configured to support articles to be conveyed, and the second link element is preferably adapted to support the first link element and to allow the chain to be moved when in use in the conveyor. The second link element preferably comprises a hinging region for hinging said link to a further link of the chain, said hinging region being preferably adapted to the insertion within it of a hinging element along an insertion direction. The first link element preferably comprises confining means adapted, when the first link element is coupled to the second link element, to confine said hinging element within the hinging region along the insertion direction, thereby preventing the hinging element to escape from said hinging region along the insertion direction.

The link preferably comprises coupling means for coupling the first link element and the second link element to each other. The coupling means preferably comprises a first coupling element preferably provided in said confining means and a second coupling element preferably provided in the second link element and adapted to be coupled to the first coupling element. The first and second coupling elements are preferably configured to lock to each other, in particular such that a hinging element—free coupling between the first and the second link elements is obtained.

According to an embodiment of the present invention, the first link element comprises a first surface adapted to support the articles to be conveyed and a second surface opposite the first surface. Said confining means preferably comprise at least one wall extending from the second surface of the first link element towards the hinging region.

According to an embodiment of the present invention, the hinging region comprises at least one hollow adapted to receive the hinging element. Said confining means are preferably adapted to cover said at least one hollow so as to prevent the hinging element within it from escaping along the insertion direction.

According to an embodiment of the present invention, the first link element and the second link element are coupleable to each other in a reversible manner.

According to an embodiment of the present invention, the link, in particular said coupling means of the link, further comprises snap coupling means for snap coupling the first link element and the second link element to each other.

According to an embodiment of the present invention, said snap coupling means comprises a first coupling element provided in the first link element and a second coupling element provided in the second link element adapted to be snap coupled to the first coupling element.

According to an embodiment of the present invention, said first coupling element is provided in a portion of said confining means, and said second coupling element is provided in a portion of the hinging region.

According to an embodiment of the present invention, the link further comprises positioning means adapted to align the first and second link elements to each other, and for guiding the coupling of the first and second link elements.

According to an embodiment of the present invention, said positioning means comprises a first positioning element provided in the first link element and a second positioning element provided in the second link element and adapted to couple to the first positioning element.

BRIEF DESCRIPTION OF THE DRAWINGS

One or more embodiments of the present invention, as well as further features and the related advantages, will be better understood with reference to the following detailed description, given purely by way of non-limitative example only, to be read in conjunction with the accompanying figures (wherein corresponding elements are indicated with the same or similar references and their explanation is not repeated for the sake of brevity). In this respect, it is expressly understood that the figures are not necessarily drawn to scale (with some details that may have been exaggerated and/or simplified) and that, unless otherwise stated, they are merely exploit to conceptually illustrate the described structures and procedures. In particular:

FIGS. 2C-2G show perspective views of the portion of the chain of FIG. 2A in respective mounting phases, according to an embodiment of the present invention;

DESCRIPTION OF EMBODIMENTS OF THE PRESENT INVENTION

Figure 1A:
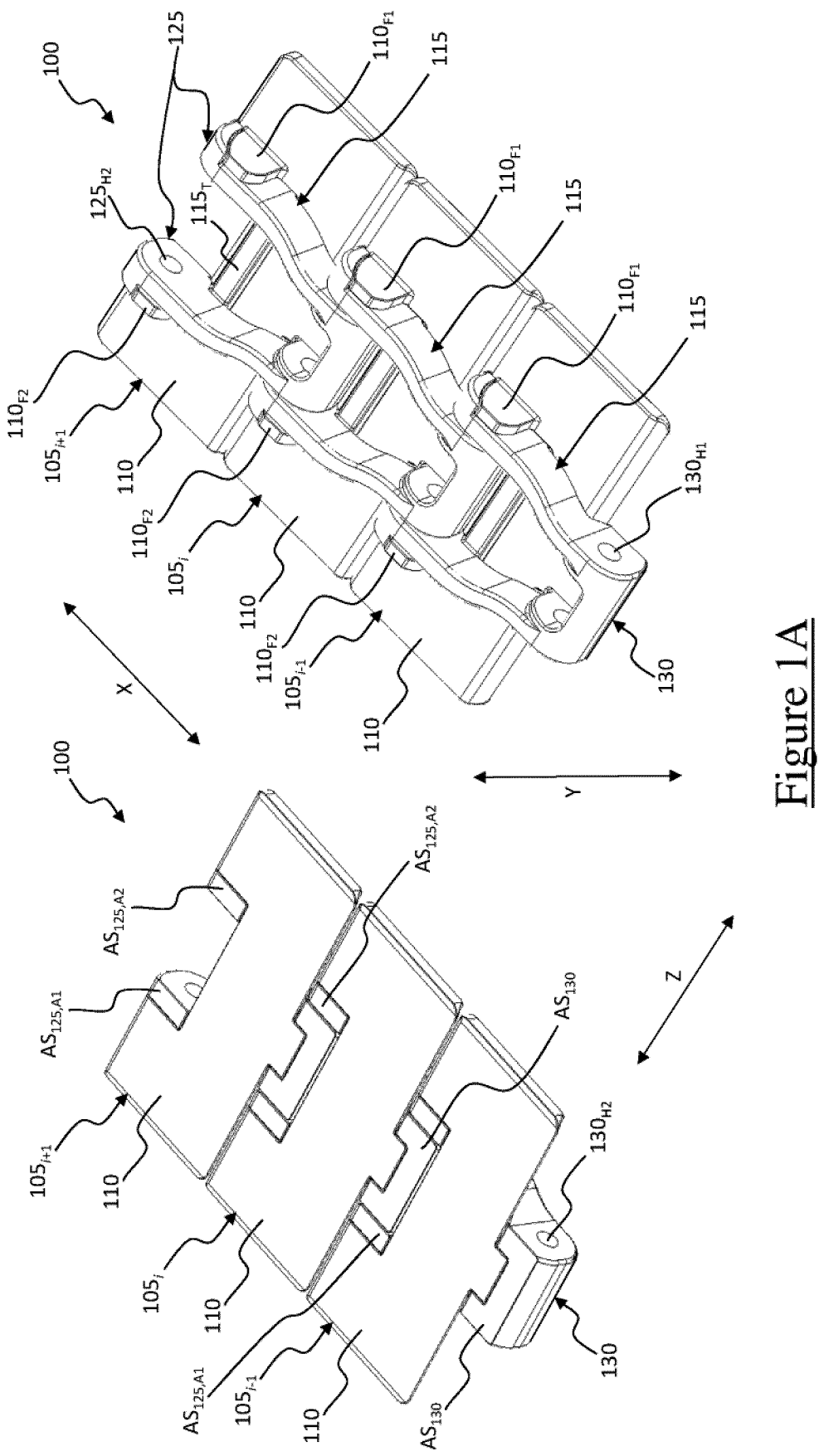
FIG. 1A shows perspective views of a portion of a chain for an article conveyor according to an embodiment of the present invention.

With reference to FIG. 1A, it shows perspective views of a chain 100 (i.e., of a portion thereof) for an article conveyor according to an embodiment of the present invention.

The article conveyor (not shown) may be an article conveyor for industrial or civil use. The article conveyor, not limiting for the present invention, will be briefly discussed, by referring, if necessary, to functional elements thereof deemed relevant for the understanding of the present invention.

In the following, directional terminology (for example, top, bottom, upper, lower, side, central, longitudinal, transverse, vertical, left and right) associated with the chain 100 and components thereof will be used in relation to their orientation in the figures, and will not be indicative of any specific orientation (among the various ones) of use thereof. The term "substantially" will instead be used to take into consideration (desired or undesired) manufacturing tolerances.

The chain 100 is designed in such a way as to be able to flex/bend upwards and downwards with respect to a vertical direction Y, so as to be moved (for example, around pinions and cogwheels of the article conveyor, not shown) along a predefined path of the article conveyor (for example, along a, typically upper, forward section, and a, typically lower, return section, preferably complementary to the forward section). In this respect, it should be noted that the chain 100 is shown in FIG. 1A in an operative orientation (drawing on the left) and in an upside-down orientation (drawing on the right), with the operative orientation that may for example be the orientation assumed by the chain 100 along the forward section of the transportation path (which allows the conveying of the articles), and with the upside-down orientation that may for example be the orientation taken by the chain 100 along the return section of the transportation path.

The chain 100 comprises a plurality of links $105_i$ (only three of them shown in the figure) which identify, as a whole, a (e.g., upper) support surface of the chain 100 for the transportation of the articles (the support surface being for example orthogonal to the vertical direction Y): the support surface is for example formed by the exposed surface in the left drawing of FIG. 1A.

In the exemplary but non-limiting embodiment shown, the chain 100 comprises an aligned succession/sequence of links $105_i$ hinged together, with each link $105_i$ (with the exception of the first and last links of the chain 100) that is hinged to a (adjacent) following link $105_{i+1}$ and to a (adjacent) preceding link $105_{i-1}$ in the succession along a longitudinal direction X orthogonal to the vertical direction Y (with such a structure that may be replicated indefinitely, thus obtaining a chain 100 of any desired length). The longitudinal direction X may for example identify, in use, a direction of movement of the chain 100 (in a curve of the transportation path the longitudinal direction X being for example identified as the direction tangent to the curve).

The links $105_i$ are preferably identical to each other, whereby in the following same number references will be used to indicate same components of different links. Moreover, for the sake of simplicity, in the following description the number references indicating the same components of different links will not contain differentiations by means of the above-mentioned subscripts i, i−1, i+1, since it is assumed that any feature referred to the components of the generic link $105_i$ is valid also for the same components of any other link; when it will be necessary to refer to components belonging to specific links, such belonging will be expressly indicated. Similarly, the reference to the link $105_i$ will be understood as a reference to any link of the chain 100 (including the adjacent links $105_{i-1}$, $105_{i+1}$), unless the discussion of some features requires to make explicit the positional relationship of such link $105_i$ with respect to the links adjacent thereto (in which case such a positional relationship will be expressly indicated, for example by distinguishing the link $105_i$ from the preceding link $105_{i-1}$ and/or from the following link $105_{i+1}$).

In the following, for ease of description, FIG. 1A will be discussed jointly with FIG. 1B, which shows exploded perspective views of the link $105_i$ of the chain 100 in the operative orientation (drawing on the left) and in the upside-down orientation (drawing on the right), and with FIGS. 1C-1G, which show perspective views of the chain 100 (in particular of two links thereof, for example of the link $105_i$ and of the following link $105_{i+1}$) in respective mounting phases.

As shown in the figures, each link $105_i$ has a first link element (a plate, in the shown example) 110 to support the articles to be conveyed, and a second link element (a link body, in the shown example) 115, preferably coupleable in a reversible (or releasable) manner to the plate 110, for supporting the plate 110 and for allowing the movement of the chain 100. In the illustrative (but not limiting) embodiment shown, the (e.g., upper) surface of the plate 110 (which is typically exposed in the forward section of the transportation path of the article conveyor) identifies most of the support surface of the respective link 105.

The plate 110 and the link body 115 are preferably made of a plastic material. This allows obtaining the plate and the link body each one with respective components/elements made in single piece, as will be assumed in the present and in the following embodiments discussed; in any case, this should not to be construed as a limitation, since similar considerations apply also in the case that these components/elements (or at least some thereof) are made separately and fixed to each other at a later phase.

More preferably, the plate 110 and the link body 115 are made of different plastic materials, even more preferably in plastic materials that exhibit different mechanical and physical properties (as will be understood from the advantages obtained by the present invention).

As shown in FIGS. 1C-1F, each link $105_i$ is adapted to be hinged to the link adjacent thereto it $105_{i-1}$, $105_{i+1}$ (i.e., to the following link $105_{i+1}$ and/or to the previous link $105_{i-1}$) by means of a respective pin or other hinging element 120 (for example, arranged along a transverse direction Z orthogonal to the longitudinal direction X and to the vertical direction Y). In this way, in correspondence of a deflection of the transportation path, each link $105_i$ is able to flex (in the vertical direction Y) with respect to the adjacent link $105_{i-1}$, $105_{i+1}$ due to the relative rotation around the respective hinging pin 120.

The hinging pin 120 is preferably made of a metal material;

however, this should not to be construed as a limitation, since the material of the hinging pin 120 may also be chosen based on characteristics of the material of the link body (preferably, of its hinging regions, discussed below), for example in order to provide certain characteristics of mutual fluency. Moreover, although a cylindrical or substantially cylindrical pin is shown in the figures, the principles of the present invention may also be equivalently applied to other hinging elements, regardless of their shape and/or size.

Preferably, as illustrated, the link body 115 of each link $105_i$ comprises hinging regions for hinging the link $105_i$ to the following link $105_{i+1}$ and/or to the previous link $105_{i-1}$. More preferably, the link body 115 of each link $105_i$ comprises a first hinging region 125 (hereinafter referred to as front hinging region) for hinging the link $105_i$ to the following link $105_{i+1}$, and a second hinging region 130 (hereinafter referred to as rear hinging region) for hinging the link $105_i$ to the previous link $105_{i-1}$. Even more preferably, the front hinging region 125 of each link $105_i$ is adapted to receive the rear hinging region 130 of the respective following link $105_{i+1}$, and the front hinging region 125 of the link $105_i$ and the rear hinging region 130 of the respective following link $105_{i+1}$, suitably aligned along the transverse direction Z, are able to simultaneously receive a same hinging pin 120 (so as to obtain the hinging between the links), as discussed in greater detail below.

In the exemplary illustrated embodiment, the link body 115 of each link $105_i$ has a substantially fork-like shape, with two prongs $115_{A1}$,$115_{A2}$ extending substantially longitudinally (i.e., extending substantially along the longitudinal direction X) and a connecting prong extending substantially transversally (i.e., extending substantially along the transverse direction Z) which connects the prongs $115_{A1}$,$115_{A2}$ to respective ends (hereinafter referred to as connecting ends).

Each connecting end advantageously has one or more hollows (for example, a respective hole, preferably a respective through hole) $130_{H1}$,$130_{H2}$, the connecting prong, the connecting ends and the respective through holes $130_{H1}$, $130_{H2}$ preferably acting as a rear hinging region 130. Preferably, as illustrated, the rear hinging region 130 (and particularly the connecting prong and the connecting ends) has a substantially flat upper surface $AS_{130}$ that, as will be explained in the following, contributes to form the support surface of the chain 100. The upper surface $AS_{130}$ substantially has a U-shaped profile; in particular, the upper surface $AS_{130}$ of the rear hinging region 130 has a substantially rectangular shape, with the exception of a recess that defines the arms of the U-shaped profile; as will be explained in the following, this recess is advantageously functional to the coupling between the plate 110 and the link body 115.

Preferably, the free end of the prong $115_{A1}$,$115_{A2}$ (opposite to the respective connecting end) has one or more hollows (for example a respective hole, preferably a respective through hole) $125_{H1}$,$125_{H2}$, the free ends of the prongs $115_{A1}$,$115_{A2}$ and the respective through-holes $125_{H1}$,$125_{H2}$ preferably acting as the front hinging region 125. Furthermore, the prongs $115_{A1}$,$115_{A2}$ are preferably shaped in such a way that the respective free ends are at a transverse distance (i.e., along the transverse direction Z) greater with respect to the transverse distance between the connecting ends (and, therefore, with respect to the length of the connecting prong): in this way, as shown in FIG. 1A (drawing on the right) and in FIGS. 1C-1D, the front hinging region 125 of each link $105_i$ is adapted to receive the rear hinging region 130 of the respective subsequent link $105_{i+1}$, and the respective through holes $125_{H1}$,$125_{H2}$,$130_{H1}$,$130_{H2}$, aligned with each other along the transverse direction Z, are adapted to receive a same hinging pin 120 along the transverse direction Z (the transverse direction Z thus identifying also an insertion direction, and hence an extraction direction, of the hinging pin 120), thus obtaining the hinging between the link body 115 of the link 105$_i$ and the link body 115 of the subsequent link 105$_{i+1}$ (as shown by way of example in FIGS. 1C and 1D).

Preferably, the through holes 125$_{H1}$,125$_{H2}$,130$_{H1}$,130$_{H2}$ have a shape corresponding to the shape of the hinging pin 120 they are intended to receive. In the exemplary considered embodiment in which the hinging pin 120 has a cylindrical or substantially cylindrical shape, the through holes 125$_{H1}$,125$_{H2}$,130$_{H1}$,130$_{H2}$ have a circular or substantially circular shape. Advantageously, the through-holes 125$_{H1}$,125$_{H2}$,130$_{H1}$,130$_{H2}$ are made with diameters having sufficiently larger size than the diameter of the hinging pin 120 to allow the passage of the latter through the through holes 125$_{H1}$,125$_{H2}$,130$_{H1}$,130$_{H2}$ substantially with no friction or with reduced friction (as discussed in greater detail below), but sufficiently small to constrain each link 105$_i$ to rotate about a fixed rotation axis identified by the respective hinging pin 120 (the presence of a fixed rotation axis allowing each link 105$_i$ to flex with respect to the adjacent link 105$_{i-1}$, 105$_{i+1}$ without misalignment).

Preferably, as illustrated, the front hinging region 125 has, at the free end of the prong 115$_{A1}$,115$_{A2}$, an upper, substantially flat surface $AS_{125,A1}$,$AS_{125,A2}$ that, as will be explained in the following, contributes to form the support surface of the chain 100. More preferably, each upper surface $AS_{125,A1}$,$AS_{125,A2}$ has a substantially rectangular shape. Still more preferably, each upper surface $AS_{125,A1}$,$AS_{125,A2}$ has a shape substantially corresponding to that of the arms of the U-shaped profile of the upper surface $AS_{130}$ of the rear hinging region 130 (in this way, as will be explained in the following, putting the upper surface $AS_{125,A1}$,$AS_{125,A2}$ of the front hinging region 125 of the link 105$_i$ near the upper surface $AS_{130}$ of the rear hinging region 130 of the following link 105$_{i+1}$ defines a substantially continuous surface—i.e., without steps—which contributes to form the support surface of the chain 100).

Advantageously, as shown, the upper surfaces $AS_{125,A1}$, $AS_{125,A2}$,$AS_{130}$ have considerably smaller size than the size of the upper surface of the plate 110, so that, in use, the upper surface of the plate 110 is mainly in contact with the conveyed products (thus minimizing possible instability of the conveyed products due to inevitable, albeit minimal, discontinuities between the upper surfaces $AS_{125,A1}$, $AS_{125,A2}$,$AS_{130}$ and/or between such upper surfaces and the upper surface of the plate 110). Furthermore, designing the link body 115 so that the upper surfaces $AS_{125,A1}$,$AS_{125,A2}$, $AS_{130}$ are exposed (although, advantageously, with minimized sizes), rather than providing a lowering of the front 125 and rear 130 hinging regions in such a manner that they are also completely covered by the upper surface of the plate 110, allows obtaining a chain 100 with improved mechanical characteristics; in fact, the lowering of the front 125 and rear 130 hinging regions would determine removal of material from them, which would jeopardize the mechanical strength of the chain 100.

As better visible in FIG. 1A, when the link body 115 and the respective plate 110 are coupled together (with this coupling that will be discussed in greater detail below), the link body 115 extends substantially below (or above, when taking the return section as a reference) of the respective plate 110 (i.e., from a lower surface opposite to the support or upper surface) along the vertical direction Y: the lower surface is for example formed by the exposed surface in the right drawing of FIG. 1A. In this way, when the link 105$_i$ is hinged to the following link 105$_{i+1}$, the link body 115 of this link 105$_i$ (that is, the prongs 115$_{A1}$,115$_{A2}$ and the respective connecting prong), the plate 110 of this link 105$_i$ and the rear hinging region 130 of the link body 115 of the following link 105$_{i+1}$ delimit, along the longitudinal X, vertical Y and transverse Z directions, a mounting region for mounting on it the pinions and cogwheels that allow the movement of the chain 100.

As previously mentioned, each link body 115 is able to support the respective plate 110, with this support function that may for example be obtained by resting the plate 110 on one or more contact regions of the prongs 115$_{A1}$,115$_{A2}$. Additionally or alternatively, as illustrated, each link body 115 comprises a support element, or more thereof, to support the plate from below. Preferably, the support element is in the form of a crosspiece 115$_T$ extending along the transverse direction Z between the prongs 115$_{A1}$,115$_{A2}$, preferably in correspondence of the front hinging region 125.

As visible in the figures, each plate 110 comprises confinement means adapted to confine or contain the hinging pin 120 associated with the respective link 105$_i$ within the front hinging region 125 (and, hence, within the rear hinging region 130 of the following link 105$_{i+1}$), thus preventing the hinging pin 120 to escape (and, hence, to jeopardize the hinging between the links).

Thanks to the confinement/containment means, it is possible to avoid that the hinging pin 120 escapes from the respective through holes 125$_{H1}$,125$_{H2}$,130$_{H1}$,130$_{H2}$ along the transverse direction Z.

Therefore, thanks to the confinement/containment means, the through holes 125$_{H1}$,125$_{H2}$,130$_{H1}$,130$_{H2}$ through which the hinging pin 120 is inserted may be formed with diameters having sufficiently larger size than the diameter of the hinging pin 120 to allow the passage of the latter through the through holes 125$_{H1}$,125$_{H2}$,130$_{H1}$,130$_{H2}$ substantially without friction or with reduced (or low) friction (i.e., by a sliding that can be easily performed manually, without requiring any specific tool and/or without or with reduced application of force); in fact, contrary to the prior-art solutions in which the hinging pin is held in position within the through holes exclusively by friction (whereby through holes with diameters having imperceptibly larger size than the hinging pins are required, and, hence, specific tools and/or the application of a high force for allowing its insertion and extraction are required), the present invention allows obtaining a hinging pin 120 than can slide freely or with reduced (or moderate) friction through the through holes 125$_{H1}$,125$_{H2}$,130$_{H1}$,130$_{H2}$, while ensuring a confinement of the hinging pin 120 within such through holes 125$_{H1}$,125$_{H2}$,130$_{H1}$,130$_{H2}$ along the transverse direction Z (in the following, transverse or lateral confinement).

Advantageously, the presence of reduced (or moderate) friction allows firmly hinging a very large number of link bodies to each other, without risks of hinging pin escaping, thereby obtaining a pre-assembled base structure that can be easily stored (for example, that can be easily wrapped around) and transported, which can be completed (so as to obtain the respective chain) at a later phase through mounting of the desired plates 110.

More advantageously, such a reduced (or moderate) friction is mainly generated between the hinging pin 120 and the front hinging region 125, with the rear hinging region 130 that may instead be shaped in such a way to define a mechanical play adapted to allow the free articulated movement while wrapping around the pinions.

By way of a quantitative example only, such a reduced (or moderate) friction may cause interference between the hinging pin 120 and (at least) the front hinging region 125 which produces, as a whole, a resistance to axial extraction (i.e., along the transverse direction Z) of the hinging pin 120 equal to about 3-5 kg; on the contrary, in the prior art solutions in which the hinging pin is kept in position within the through holes exclusively by friction, the interference between the hinging pin and the respective through holes typically generates a resistance to axial extraction of the hinging pin equal to about 25-80 kg (in order to guarantee the safe holding in place of the hinging pin even in the presence of impacts, penetration of lubricants, high axial stresses, and temperature excursions).

It should also be noted that the principles of the present invention may also be applied to the aforementioned prior art solutions in which the hinging pins are kept within the through holes exclusively by friction; in fact, in these solutions, the friction between the hinging pins and the through holes could decrease over time (for example as a result of wear of the material caused by the continuous rubbing between the hinging pins and the through holes due to the movement of the chain, in particular during flexing/bending thereof) so that the lateral confinement according to the principles of the present invention offers substantial advantages even to such solutions.

Figure 1B:
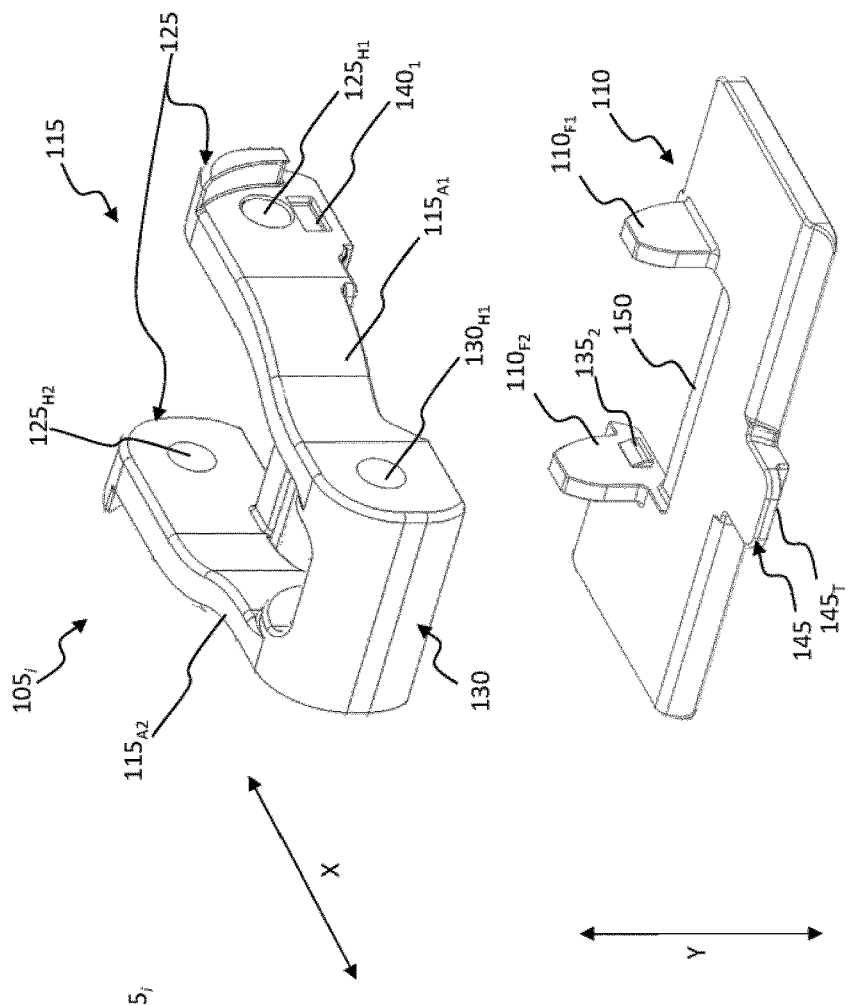
FIG. 1B shows perspective exploded views of a link of the chain of FIG. 1A according to an embodiment of the present invention.
Figure 1B:
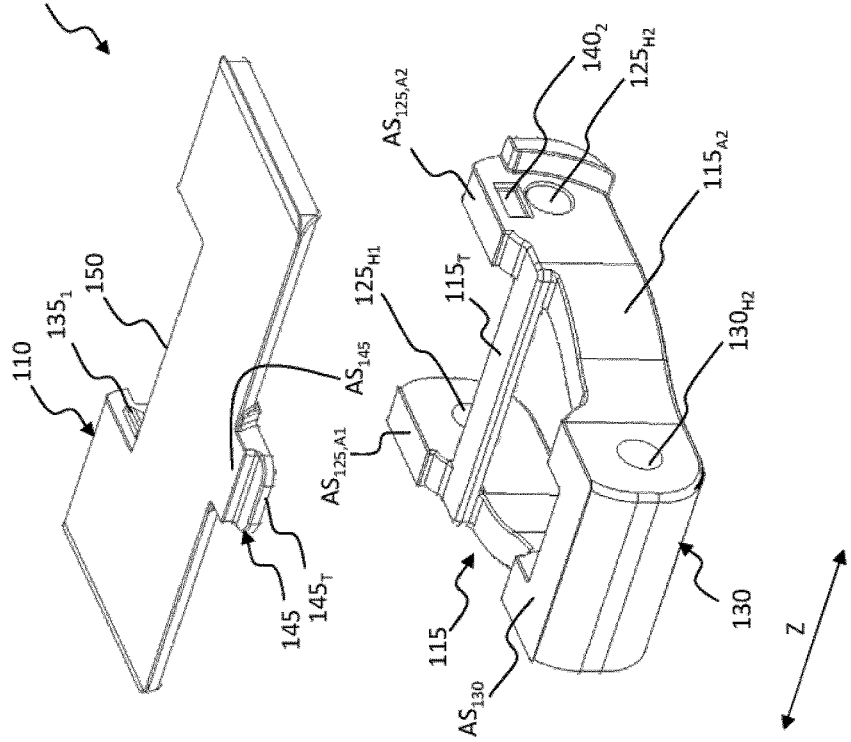
Figure 1C:
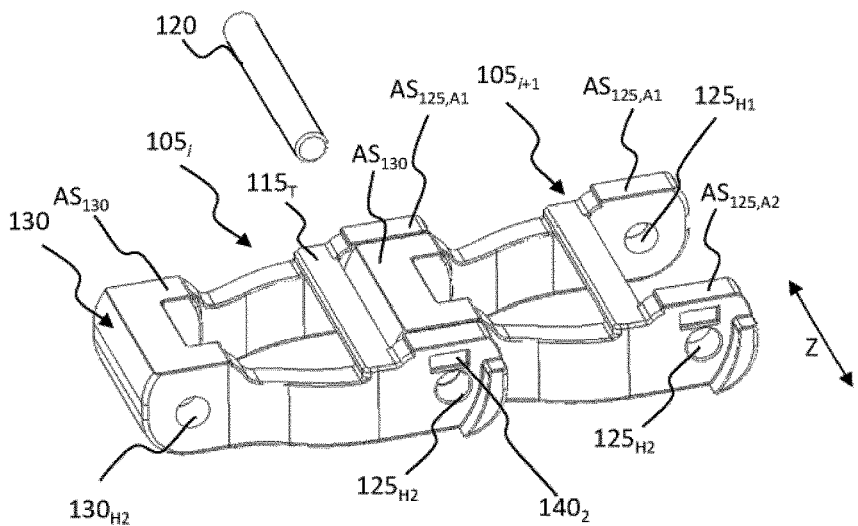
FIGS. 1C-1G show perspective views of the portion of the chain of FIG. 1A in respective mounting phases, according to an embodiment of the present invention.
Figure 1D:
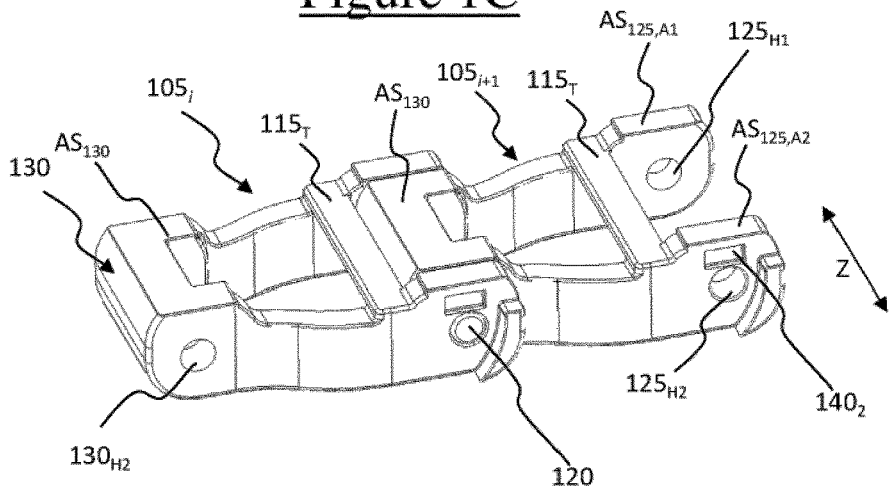
Figure 1E:
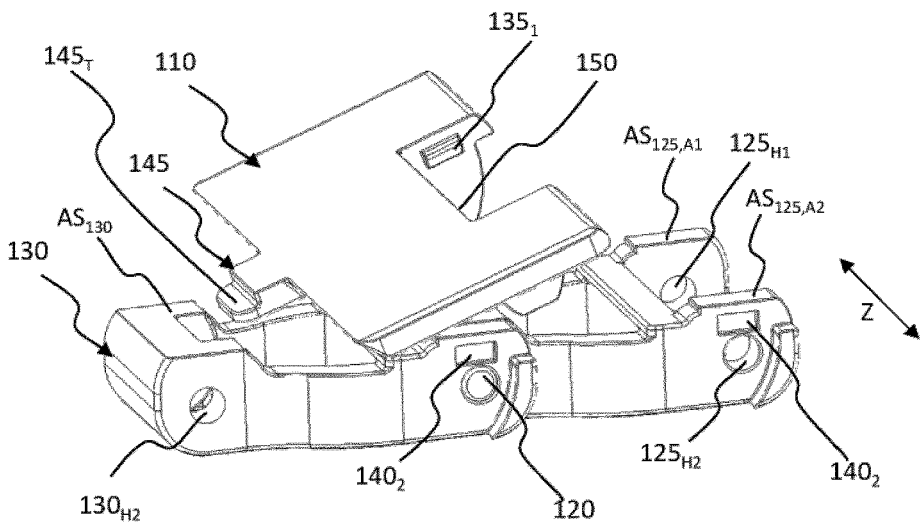

As visible in FIGS. 1A, 1B (drawing on the right) and 1E-1G, said confinement means comprises, according to an embodiment of the present invention, walls (for example, two walls $110_{F1}, 110_{F2}$, each one being preferably associated with a respective through hole $125_{H1}, 125_{H2}$) extending, along the vertical direction Y, from the bottom surface of each plate 110 towards the front hinging region 125 (or, in alternative embodiments of the present invention, mentioned in the following, towards the rear hinging region 130). The extent, along the vertical direction Y, of the walls $110_{F1}, 110_{F2}$ is such that, when the plate 110 is coupled to the respective link body 115, each wall $110_{F1}, 110_{F2}$ covers a respective through hole $125_{H1}, 125_{H2}$ (in particular, an opening thereof—in the following, external opening—that faces at the outside of the link body 115) of the corresponding front hinging region 125: therefore, the vertical direction Y also identifies a confinement direction of the confinement means.

Since, in the exemplary embodiment, the walls $110_{F1}, 110_{F2}$ have a shape substantially corresponding to that of the external openings of the through holes $125_{H1}, 125_{H2}$, they will be indicated in the following as fins $110_{F1}, 110_{F2}$ (so as to distinguish these from the walls of the subsequent embodiment, which has an extension along the longitudinal direction X considerably greater than that of the fins $110_{F1}, 110_{F2}$).

Preferably, the fins $110_{F1}, 110_{F2}$ are made of a plastic material, more preferably they are made in a single piece with the respective plate 110 (for example, by injection molding techniques). Even more preferably, the fins $110_{F1}, 110_{F2}$ are made of a plastic material which is sufficiently rigid to allow the hinging pin 120 to be confined without being deformed, and sufficiently elastic to allow momentary deformations of the same (for example, in order to allow the coupling and the decoupling between the plate 110 and the link body 115, as discussed below).

The positioning of the fins $110_{F1}, 110_{F2}$ substantially flush (or overlapping) with the external opening of the through hole $125_{H1}, 125_{H2}$ essentially derives from the fact that, in the exemplary embodiment considered, the length of the hinging pin 120 is lower than the distance between the external openings of the through holes $125_{H1}, 125_{H2}$ (so that, once inserted into the through holes $125_{H1}, 125_{H2}, 130_{H1}, 130_{H2}$, the hinging pin 120 does not protrude from these external openings). However, this should not to be construed as a limitation, since it is possible to provide hinging pins of any length: considering for example embodiments, not shown, in which the hinging pin has a length greater than the distance between the external openings of the through holes $125_{H1}, 125_{H2}$, it is possible to provide fins spaced along the transverse direction Z by an amount corresponding to the length of the hinging pin (so that the fins are in close proximity with the ends of the respective hinging pin, rather than with the external openings of the through holes $125_{H1}, 125_{H2}$). Moreover, according to further embodiments of the present invention, not shown, the distance between the fins along the transverse direction Z can be adjusted manually in a dynamic manner (by providing for example one or more guides on the lower surface of the plate within which these fins can slide).

As previously mentioned, the plate 110 and the link body 115 may be coupled together in a reversible (or releasable) manner.

According to an embodiment of the present invention, this relatively stable and reversible coupling is obtained by coupling element(s) provided in the plate 110 and coupling element(s) provided in the link body 115 that are in the form of snap coupling elements and/or means (or snap fit elements and/or means).

Preferably, as can be seen in FIG. 1B, such snap coupling elements comprise one or more projections preferably provided in the plate 110 and adapted to snap fit into one or more hollows preferably provided in the link body 115. More preferably, such snap coupling elements comprise two projections $135_1, 135_2$ each one adapted to snap fit into a respective hollow $140_1, 140_2$. Even more preferably, each projection $135_1, 135_2$ has a substantially wedge shape, for example with progressively increasing protrusion from the bottom upwards along the vertical direction Y (taking as reference the orientation shown in the left drawing of FIG. 1B); in this way, by sliding the plate 110 on the link body 105 from the top to the bottom (for example in the manner illustrated in FIGS. 1E-1G, which will be better discussed below), the projection $135_1, 135_2$ is progressively channeled within the hollow $140_1, 140_2$, until it snaps into it. Thus, the plate 110 provided as a first link element is coupled directly to the link body 115 provided as a second link element. In particular, the first and second link elements are not coupled indirectly via a hinging element. The two projections $135_1, 135_2$ provided as first coupling element on the plate 110 engage the two hollows $140_1, 140_2$ provided as second coupling element in the link body 115, such that a direct coupling is achieved therebetween. Thereby, a construction may be provided that is relatively easy to assemble and/or disassemble, which may e.g. lead to shorter downtime for maintenance and/or part replacement. The hinging pin 120 is not part of the coupling elements such that the coupling between the plate 110 and the link body 115 is achieved independent from the presence of the hinging pin 120 in the through holes $125_{H1}, 125_{H2}$. The fact that the plate 110 and the link body 115 are not coupled via the hinging pin 120 also makes coupling (and decoupling) operations (e.g., for replacements due to breakages or wear) easier. Indeed, the hinging pin 120 does not hinder or interfere with the coupling element(s), whereby the coupling (and decoupling) operations can be performed without having to deal with the hinging pin 120.

Advantageously, the link 105 may conveniently be stored in an assembled state without requiring a hinge pin 120 as coupling means and/or element. This makes storage of the plate 110 and of the link body 115 easier and more effective. Indeed, arranging the plates 110 mounted (and locked) on the respective link bodies 115 allows an orderly storing of the links; moreover, the covering of the through holes $125_{H1}, 125_{H2}$ by the confinement means upon coupling between the plate 110 and the link body 115 avoids that, when no hinging pin 120 is fitted into the through holes $125_{H1}, 125_{H2}$, dust, dirt or other undesired substances enter the through holes $125_{H1}, 125_{H2}$, thus allowing the links to be stored for relatively long periods of use.

In the exemplary embodiment, the two projections $135_1$, $135_2$ are each provided in respective fins $110_{F1}, 110_{F2}$ that are provided as confining means as will be described in more detail later on.

Preferably, as illustrated, the hollow $140_1, 140_2$ is provided at the external opening of a respective through hole $125_{H1}, 125_{H2}$, and the projection $135_1, 135_2$ is provided in correspondence of the fin $110_{F1}, 110_{F2}$, each projection $135_1$, $135_2$ being for example formed in a single piece with the respective fin $110_{F1}, 110_{F2}$. These respective fins $110_{F1}$, $110_{F2}$ provide a cover of the respective through holes $125_{H1}, 125_{H2}$ which may counteract accumulation of dust, dirt and/or other undesired substances in the through holes $125_{H1}, 125_{H2}$. Providing the projection $135_1, 135_2$ in correspondence of the fin $110_{F1}, 110_{F2}$ is particularly advantageous. By providing the coupling element in the confinement means improves the structural rigidity of both the confinement means and the coupling element, while reducing the number of protrusions in the plate 110. In turn, a reduced number of protrusions in the plate 110 improves the structural strength of the plate 110, involves easier and cheaper manufacturing of the plate 110, and makes the plate 110 less prone to accumulation of e.g. dust, dirt, or the like.

According to an embodiment, the coupling between the plate 110 and the link body 115 takes place by coupling between one or more coupling elements as coupling means provided in the plate 110 and one or more coupling elements as coupling means provided in the link body 115.

According to an embodiment, the coupling element(s) provided in the plate 110 and the coupling element(s) provided in the link body 115 are configured to lock to each other, preferably in a reversible (or releasable) manner.

The locking between the coupling element(s) provided in the plate 110 and the coupling element(s) provided in the link body 115 allows obtaining a direct coupling between the plate 110 and the link body 115 that is stable per se, i.e. no additional element external to the plate 110 and the link body 115 is required to stably couple the plate 110 and the link body 115 to each other.

According to an embodiment, as shown in FIG. 1B, the hollow $140_1, 140_2$ is provided above the respective through hole $125_{H1}, 125_{H2}$ along the vertical direction Y (taking as reference the orientation shown in the left drawing of FIG. 1B), whereas the projection $135_1, 135_2$ is provided, in the respective fin $110_{F1}, 110_{F2}$, in an upper region (taking as reference the orientation shown in the left drawing of FIG. 1B) of an inner surface of the fin $110_{F1}, 110_{F2}$ that, in use, faces the external opening of the through hole $125_{H1}, 125_{H2}$.

In this way, by sliding the plate 110 on the link body 105 from the top downwards (for example in the manner illustrated in FIGS. 1E-1G), the projection $135_1, 135_2$ (due to the aforementioned elastic deformation of the respective fin $110_{F1}, 110_{F2}$ caused by the stress caused by the sliding) is progressively channeled into the hollow $140_1, 140_2$, until it is completely inserted into it (so that, when the stress is removed, the fin $110_{F1}, 110_{F2}$, which tends to elastically regain its original shape, pushes the projection $135_1, 135_2$ against the respective hollow $140_1, 140_2$, thus obtaining a snap engagement which prevents the extraction of the projection $135_1, 135_2$ by simple reverse sliding). In the exemplary illustrated embodiment, in order to allow decoupling between the plate 110 and the link body 105, it is possible to apply a vertical force on the plate 110 from the bottom upwards (taking as a reference the orientation shown in the left drawing of FIG. 1B); such a vertical force it in turn generates a flexing of the plate 110 which allows a momentary increase in the distance between the fins $110_{F1}, 110_{F2}$ at the same time, thus obtaining the disengagement of the projection $135_1, 135_2$ from the respective hollow $140_1, 140_2$.

Therefore, the interaction between the projection $135_1$, $135_2$ and the hollow $140_1, 140_2$ allows coupling the plate 110 and the link body 115 to each other in a stable and reversible manner.

Moreover, thanks to the presence, position and shape of the projection $135_1, 135_2$, the disengagement of the projection $135_1, 135_2$ from the respective hollow $140_1, 140_2$ (or, generally, the decoupling between the plate 110 and the link body 115) can be easily carried out by flexing upwards the ends of the plate 110 (taking as reference the orientation shown in the left drawing of FIG. 1B). Therefore, the disengagement of the projection $135_1, 135_2$ from the respective hollow $140_1, 140_2$ (or, generally, the decoupling between the plate 110 and the link body 115) can be performed with bare hands (i.e., without any tool or machinery) and essentially in any position or zone of the transportation path. This way, accessibility of the hinging element and/or the coupling means may be further improved.

Although in the present and in the subsequent embodiments the coupling between the plate and the link body is carried out in correspondence of the front hinging region, this should not to be construed as a limitation. In fact, it is possible to provide implementations (not shown, but applicable to the present and to the subsequent embodiments discussed), in which this coupling is performed in correspondence of the rear hinging region, or in a region of the link body between the front hinging region and the rear hinging region (along the longitudinal direction X), with consequent positioning of the projections (or other similar coupling elements provided in the plate) and of the hollows (or other similar coupling elements provided in the link body) that could therefore differ from the one shown.

In addition, although in the present and in the subsequent embodiments, the projections and hollows are preferably provided in the plate and in the link body, respectively, this should not be construed as a limitation. In fact, it is possible to provide implementations (not shown, but applicable to the present and subsequent embodiments discussed), in which the projections (or other similar coupling elements) are provided in the link body and the hollows (or other similar coupling elements) are provided in the plate.

The possibility of easily and reversibly coupling the plate 110 and the link body 115 (that is, the possibility of forming the plate 110 and the link body 115 as separate parts that can be reversibly coupled) allows obtaining a wide variety of customizations.

For example, the link body 115 and the plate 110 may be made of different (preferably plastic) materials. Advantageously, the link body 115 may be made of materials with high mechanical properties (for example, high mechanical strength), whereas the plate 110 may be made of materials having high physical properties (for example, low friction and/or high resistance to wear) and reduced costs; in fact, there are no materials on the market that have both high mechanical properties and high physical properties, and that, at the same time, have affordable prices (so that the chains of the state of the art, which are formed in a single piece, are typically made with a unique and expensive material that at least meets the requirements of high mechanical properties).

In addition, the possibility of simply and reversibly coupling the plate 110 to the link body 115 allows adapting the chain 100 to the articles to be transported (in that the plates can be replaced by plates of different sizes, shapes and/or materials). Moreover, since, as discussed above, the presence of reduced (or moderate) friction makes it possible to firmly hinge a very large number of link bodies to each other, thus obtaining a pre-assembled base structure that can be easily stored and transported, the possibility of easily coupling the plate 110 and the link body 115 to each other allows completing this pre-assembled base structure by subsequent mounting of the desired plates 110 efficiently (i.e., with limited assembly times and costs).

Preferably, as shown in the figures, the plate 110 has, in plan view, a substantially rectangular shape, with the exception of an appendix 145 and a recess 150, preferably provided on sides of the plate 110 which, in use (i.e., when the plate 110 and the link body 115 are coupled to each other), face the rear 130 and front 125 hinging regions, respectively (whereby in the following these sides will also be referred to as the rear side and front side respectively). In any case, as will be understood, the appendix 145 and/or the recess 150 may also be omitted in embodiments (not shown) of the present invention, for example by providing alternative technical devices for obtaining similar purposes to those for which appendix 145 and/or the recess 150 have been designed.

The appendix 145 is advantageously provided to act as an alignment/positioning means and as a fulcrum for coupling the plate 110 to the respective link body 115.

The appendix 145 preferably comprises an upper surface $AS_{145}$ which is typically exposed in the forward section of the transportation path of the article conveyor (and which forms part, preferably a negligible part, of the support surface of the chain 100 when the plate 110 and the link body 115 are coupled together, as discussed here below): similarly to what has been discussed for the upper surfaces $AS_{125,A1}$, $AS_{125,A2}$, $AS_{130}$, the upper surface $AS_{145}$ of the appendix 145 advantageously has considerably reduced sizes with respect to the size of the upper surface of the plate 110, so that, in use, mainly the upper surface of the plate 110 comes into contact with the conveyed products (thus minimizing possible instability of the conveyed products due to inevitable, albeit minimal, discontinuities between the upper surfaces $AS_{125,A1}$, $AS_{125,A2}$, $AS_{130}$, $AS_{145,A1}$ and/or between such upper surfaces and the upper surface of the plate 110).

Figure 1F:
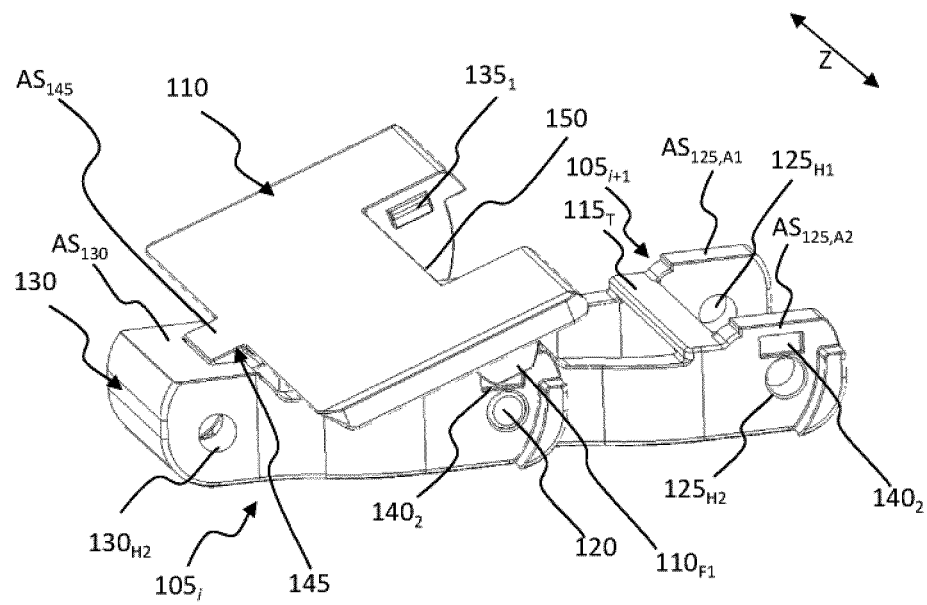
Figure 1G:
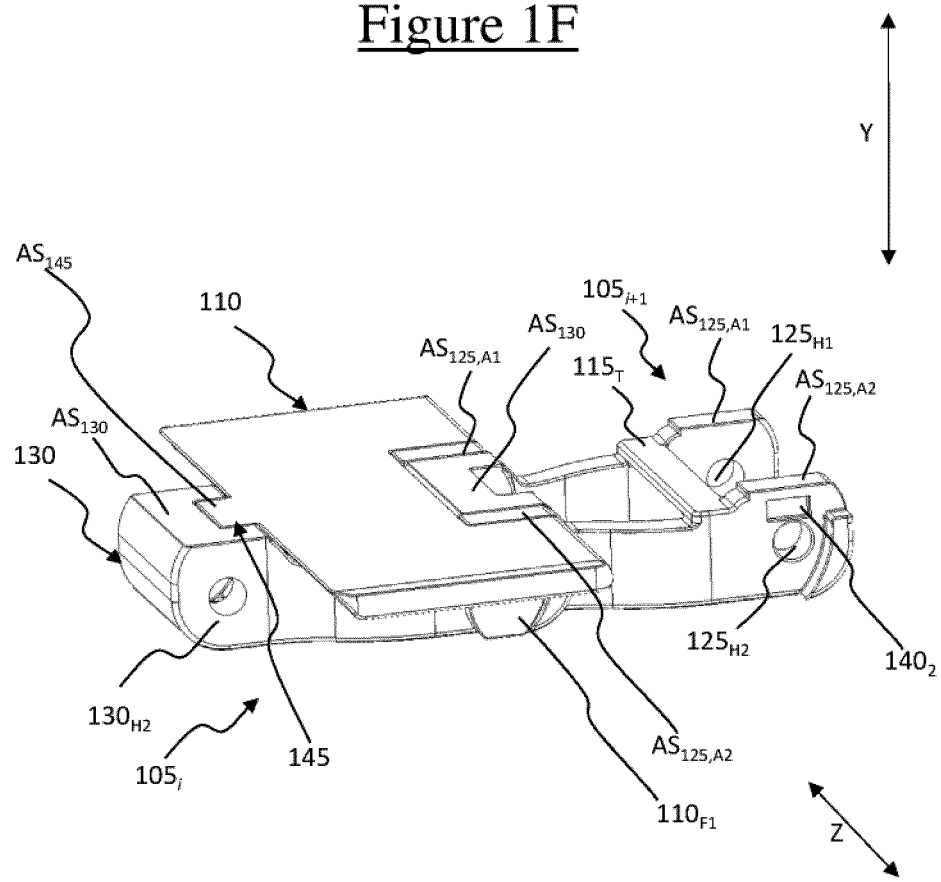

Preferably, as illustrated, the appendix 145 further comprises a tongue portion $145_T$ (preferably formed, along the vertical direction Y, below the upper surface $AS_{145}$ of the appendix 145, and protruding, along the longitudinal direction X, beyond the upper surface $AS_{145}$ of the appendix 145); this tongue portion $145_T$ is advantageously adapted to be inserted in a seat (not visible) of the rear hinging region 130, so that, by inserting the tongue portion $145_T$ into the seat and pushing down the plate 110, the plate 110 is guided in rotation towards the link body 115 (with the tongue portion $145_T$ that acts as a fulcrum) up to the engagement of the projections $135_1$, $135_2$ with the respective hollows $140_1$, $140_2$ (as shown in FIGS. 1F and 1G), and consequently, until the plate 110 rests on the respective crosspiece $115_T$ (the crosspiece $115_T$ and the seat in the rear hinging region 130 thus supporting the plate 110 at its front and rear sides, respectively).

As can be seen in FIGS. 1F and 1G, once the plate 110 is coupled to the link body 115, the upper surface $AS_{145}$ of the appendix 145 of the link $105_i$ fits into the recess of the upper surface $AS_{130}$ of the rear hinging region 130 of the same link $105_i$, and the upper surface $AS_{125,A1}$, $AS_{125,A2}$ of the front hinging region 125 of the link $105_i$ defines, with the upper surface $AS_{130}$ of the rear hinging region 130 of the following link $105_{i+1}$ and with the upper surface $AS_{145}$ of the appendix 145 of the plate 110 of the following link $105_{i+1}$, a substantially continuous surface. Therefore, the upper surface of the plate 110 of the link $105_i$ (including the upper surface $AS_{145}$ of its appendix 145), the upper surface $AS_{130}$ of the rear hinging region 130 of the following link $105_{i+1}$, the upper surface $AS_{125,A1}$, $AS_{125,A2}$ of the region of front hinging 125 of the link $105_i$, the upper surface $AS_{130}$ of the rear hinging region 130 of the following link $105_{i+1}$ and the upper surface $AS_{145}$ of the appendix 145 of the plate 110 of the following link $105_{i+1}$ identify a substantially continuous surface forming the portion of the support surface of the chain 100 associated with the link $105_i$ (although, as discussed above, the sizes of the upper surfaces $AS_{125,A1}$, $AS_{125,A2}$, $AS_{130}$, $AS_{145}$ are advantageously minimized in the design phase with respect to the size of the upper surface of the plate 110).

Figure 2A:
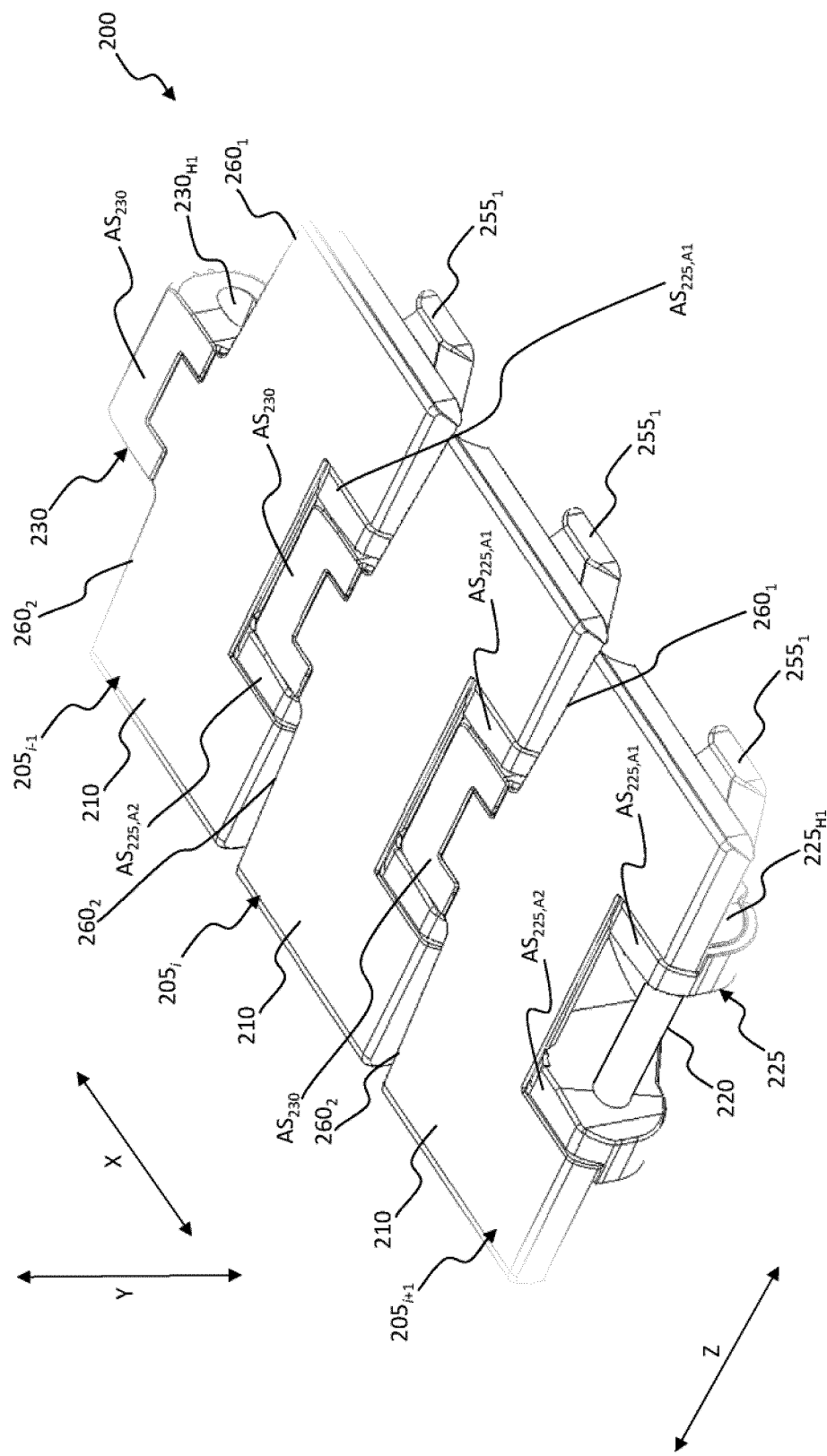
FIG. 2A shows a top perspective of a portion of a chain for an article conveyor according to another embodiment of the present invention.
Figure 2B:
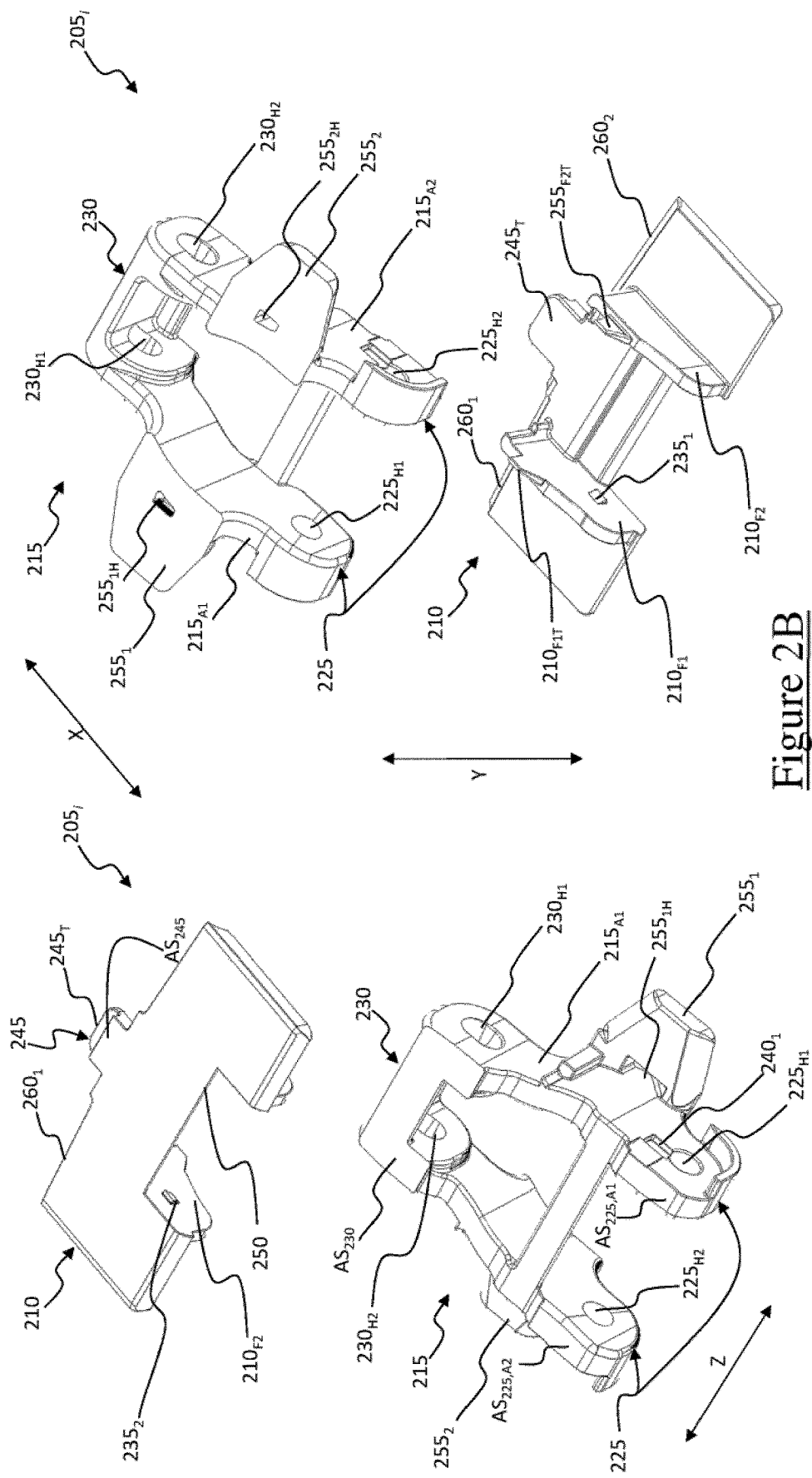
FIG. 2B shows perspective exploded views of a link of the chain of FIG. 2A according to an embodiment of the present invention.

With reference now to FIG. 2A, it shows a top perspective view of a chain 200 (i.e., of a portion thereof) for an article conveyor according to another embodiment of the present invention. In the following, for ease of description, FIG. 2A will be discussed jointly to FIG. 2B, which shows perspective exploded views of a link $205_i$ of the chain 200 in the operative orientation (drawing on the left) and in the upside-down orientation (drawing on the right), to FIGS. 2C-2G, which show perspective views of the chain 200 in respective mounting phases, and to FIG. 2H, which shows a top view of the chain 200 in a curved condition.

In the following, components of the chain 200 and/or of the link $205_i$ corresponding to those of the chain 100 and/or of the link $105_i$, respectively, will be indicated by similar references, and their description will be simplified or omitted for brevity of description. Furthermore, since in FIG. 2A the chain 200 is rotated by 180° on the X-Z plane with respect to the chain 100, some components of the chain 200 and of the chain 100 are in mutually opposite positions.

In the same way as discussed above, each link $205_i$ has a first link element (a plate, in the illustrated example) 210 to support the articles to be conveyed, and a second link element (a link body, in the illustrated example) 215, preferably reversibly coupleable to the plate 210, to support the plate 210 and to allow the movement of the chain 200, with each link $205_i$ that is adapted to be hinged to the link adjacent thereto $205_{i-1}$, $205_{i+1}$ (i.e., to the following link $205_{i+1}$ and/or to the previous link $205_{i-1}$) by means of a respective hinging pin 220 (for example, along the transverse direction Z).

Preferably, as illustrated, the link body 215 of each link $205_i$ comprises a front hinging region 225 for hinging the link $205_i$ to the following link $205_{i+1}$, and a rear hinging region 230 for hinging the link $205_i$ to the previous link $205_{i-1}$. Similarly to what was discussed previously, the front hinging region 225 of each link $205_i$ is preferably adapted to accommodate the rear hinging region 230 of the respective following link $205_{i+1}$, and the front hinging region 225 of link $205_i$ and the rear hinging region 230 of the respective subsequent link $205_{i+1}$, properly aligned to each other along the transverse direction Z, are preferably designed to simultaneously receive a same hinging pin 220 (so as to obtain a hinging between the links).

In the exemplary illustrated embodiment, the link body 215 of the link $205_i$ is similar to the link body 115 of the link $105_i$, i.e. it has a substantially fork shape, with two substantially longitudinal prongs $215_{A1},215_{A2}$, and a substantially transverse connection which connects the prongs $215_{A1}, 215_{A2}$ to respective connection ends.

Moreover, similarly to the link body 115 of the link $105_i$, the link body 215 of the link $205_i$ has a through hole $230_{H1},230_{H2}$ (or more thereof), or other cavity, each advantageously provided in a respective connecting end (the connection prong, the connecting ends and the respective through holes $230_{H1},230_{H2}$ preferably acting as rear hinging region 230), a substantially flat upper surface $AS_{230}$ (preferably similar to the upper surface $AS_{130}$) in the rear hinging region 230 (and in particular in the connection prong and in the connection ends) with substantially a U-shaped profile (that is, with a substantially rectangular shape, with the exception of a recess that is advantageously functional to the coupling between the plate 210 and the link body 215), and a hole through $225_{H1},225_{H2}$ (or more thereof), or other cavity, each advantageously provided in the free end of the prong $215_{A1},215_{A2}$ (the free ends of the prongs $215_{A1},215_{A2}$ and the respective through holes $225_{H1},225_{H2}$ preferably acting as front hinging region 225).

Unlike the previous embodiment, the through holes $230_{H1},230_{H2}$ of the rear hinging region 230 are advantageously in the form of elongated holes (or slotted holes). More advantageously, the through holes $230_{H1},230_{H2}$ are elongated along the longitudinal direction X: in this way, when the hinging pin 220 (advantageously having a cylindrical shape) is inserted into the through holes $225_{H1},225_{H2}$, $230_{H1},230_{H2}$, a mechanical play is formed between the hinging pin 220 and the through holes $230_{H1},230_{H2}$ that allows each link $205_i$ to rotate with respect to the adjacent link $205_{i-1},205_{i+1}$ along the rotation plane X-Z—with the extent of this rotation that may advantageously be chosen according to the length of the through holes $230_{H1},230_{H2}$ along the longitudinal direction X. In this way, contrary to the chain 100 of the previous embodiment, the chain 200 is able to curve (to the right and to the left), as shown in FIG. 2H, on the rotation plane X-Z due to the relative movement between the link body 115 and the hinging pin 220 made possible by the mechanical play between the latter and the through holes $230_{H1},230_{H2}$. Still more advantageously, the through holes $225_{H1},225_{H2}$ of the rear hinging region 225 are instead similar to the through holes $125_{H1},125_{H2}$; in particular, the through holes $225_{H1},225_{H2}$ advantageously have a circular or substantially circular shape, and are preferably made with diameters having dimensions sufficiently greater than the diameter of the hinging pin 220 to allow the passage of the latter through them substantially without friction or with reduced friction (with extent and advantages of such a friction that are similar to those of the previous embodiment), but sufficiently small to prevent the hinging pin 220 from sliding along the longitudinal direction X: in this way, each link $205_i$ can rotating about a fixed rotation axis identified by the respective hinging pin 220 (on the contrary, the provision of the through holes $225_{H1},225_{H2}$ also in the form of elongated holes would make the hinging pin 220, and therefore the rotation axis defined by it, movable along the longitudinal direction X, with resulting stability issues of the chain 200).

In the exemplary considered embodiment, the shape of the prongs $215_{A1},215_{A2}$ is analogous to that of the prongs $115_{A1},115_{A2}$, and particularly it is such that the front hinging region 225 of each link $205_i$ can receive the rear hinging region 230 of the respective following link $205_{i+1}$ (so that the mutual alignment of the respective through holes $225_{H1}, 225_{H2},230_{H1},230_{H2}$ along the transverse direction Z, and the insertion of the same hinging pin 220 through them, allows hinging the link body 215 of the link $205_i$ to the link body 215 of the following link $205_{i+1}$, as exemplary illustrated in FIGS. 2C and 2D). Moreover, the front hinging region 225 has, in correspondence of the free end of the prong $215_{A1}, 215_{A2}$, a substantially flat upper surface $AS_{225,A1},AS_{225,A2}$, analogous to the upper surface $AS_{125,A1},AS_{125,A2}$ discussed above.

Similarly to the link body 115, the function of supporting the plate 210 by the link body 215 is advantageously promoted by a support element in the form of a crosspiece $215_T$ extending along the transverse direction Z between the prongs $215_{A1},215_{A2}$ (preferably, in correspondence of the front hinging region 225).

In the exemplary, not limiting embodiment considered, the link body 215 further comprises stabilization means to stabilize the chain 200 in a curve. Preferably, as illustrated, these stabilization means comprise wing elements $255_1,255_2$ each one extending from a respective prong $215_{A1},215_{A2}$ along the transverse direction Z, the wing elements $255_1, 255_2$ being for example formed in a single piece with the respective prongs $215_{A1},215_{A2}$. More preferably, each wing element $255_1,255_2$ extends from a lower region of the respective prong $215_{A1},215_{A2}$ that, in use, is proximal to a guide of the article conveyor (not shown), so as to keep the chain 200 adherent to the guide. However, the wing elements $255_1,255_2$ can be omitted in basic embodiments: in alternative embodiments of the present invention, it is for example possible to provide stabilization means made by means of magnetic interaction elements in the article conveyor (for example, magnets arranged along the guide) able to exert a magnetic attraction on one or more magnetic interaction elements of the chain (for example, the hinging pin, which in these embodiments may be made in ferritic steel or other ferromagnetic material to this purpose).

Similarly to the above, when the link body 215 and the respective plate 210 are coupled to each other (with such a coupling that will be discussed in greater detail in the following), the link body 215 extends substantially underneath (or above, taking the return section as a reference) of the respective plate 210 (i.e., from a bottom surface thereof opposite to the rest surface) along the vertical direction Y. In this way, when the link $205_i$ is hinged to the following link $205_{i+1}$, the link body 215 of this link $205_i$, the plate 210 of this link $205_i$ and the rear hinging region 230 of the link body 215 of the following link $205_{i+1}$ delimit, along the longitudinal X, vertical Y and transverse Z directions, a mounting region for the mounting thereon of the pinions and the cogwheels that allow the movement of the chain 200.

Similarly to the above discussion, each plate 210 comprises confinement means adapted to confine or contain the hinging pin 220 associated with the respective link $205_i$ within the front hinging region 225, thereby preventing the hinging pin 220 from escaping along the longitudinal direction X (thus jeopardizing the hinging between the links).

The confinement means preferably comprises walls $210_{F1},210_{F2}$ (for example two walls, each one preferably associated with a respective through hole $225_{H1},225_{H2}$) extending from the bottom surface of each plate 210 along the vertical direction Y.

Preferably, the walls $210_{F1},210_{F2}$ are functionally analogous to the fins $110_{F1},110_{F2}$, in that when the plate 210 is coupled to the respective link body 215 each wall $210_{F1}, 210_{F2}$ (i.e., a portion thereof) covers a respective through hole $225_{H1},225_{H2}$ (in particular, its external opening), whereby the previous considerations about the positioning of the fins $110_{F1},110_{F2}$ substantially flush with the external opening of the through hole and their distance along the transverse direction Z are valid also for the walls $210_{F1}$, $210_{F2}$. However, the walls $210_{F1}$,$210_{F2}$ are structurally different from the fins $110_{F1}$,$110_{F2}$ in that they extend substantially over the whole length of the plate 210 (along the longitudinal direction X): although not necessary, the extension for substantially all the length of the of the plate 210 is advantageous in that it allows improving the reliability of the coupling of the plate 210 to the link body 215 (as discussed in the following).

Similarly to the fins $110_{F1}$,$110_{F2}$, the walls $210_{F1}$,$210_{F2}$ are preferably made in a plastic material, more preferably they are made in a single piece with the respective plate 210 (for example, through injection molding techniques). Even more preferably, the walls $210_{F1}$,$210_{F2}$ are made in a plastic material sufficiently rigid to allow the confinement of the hinging pin without deformations, and sufficiently elastic to allow momentary deformations thereof (for example, in order to allow the coupling and decoupling between the plate 210 and the link body 215).

Similarly to the above, the coupling between the plate 210 and the link body 215 takes place by coupling between one or more coupling elements provided in the plate 210 and one or more coupling elements provided in the link body 215.

Similarly to the above, the coupling element(s) provided in the plate 210 and the coupling element(s) provided in the link body 215 are configured to lock to each other (hinging pin-free locking), preferably in a reversible (or releasable) manner, with the same advantageous effects of this hinging pin-free locking discussed in the previous embodiment that equivalently apply to the present embodiment.

Similarly to the previous embodiment, these coupling elements may comprise snap coupling or snap-fit elements, which advantageously comprises one or more (for example, two) projections $235_1$,$235_2$, preferably provided in the plate 210, each one adapted to snap fit into a respective hollow $240_1$,$240_2$, preferably provided in the link body 215. Preferably, the projections $235_1$,$235_2$ and the hollows $240_1$,$240_2$ are similar to the projections $135_1$,$135_2$ and the hollows $140_1$,$140_2$ discussed above, whereby the above considerations about shape and coupling and decoupling mode of the projections $135_1$,$135_2$ and the hollows $140_1$,$140_2$ are also valid for the projections $235_1$,$235_2$ and the hollows $240_1$,$240_2$.

Unlike the hollows $140_1$,$140_2$, which are provided above the respective through holes $125_{H1}$,$125_{H2}$ along the vertical direction Y, the hollows $240_1$,$240_2$ are provided substantially side by side (for example, as illustrated, immediately adjacent) to the through holes $225_{H1}$,$225_{H2}$ along the longitudinal direction X: this positioning of the hollows $240_1$,$240_2$ advantageously allows a higher structural solidity (since the hollows $240_1$,$240_2$ are made in a more "internal" region of the link body with respect to the hollows $140_1$,$140_2$), and it is permitted by the fact that the walls $210_{F1}$,$210_{F2}$ have an extension (along the longitudinal direction X) sufficiently higher than the extension of the fins $110_{F1}$,$110_{F2}$ to allow the projections $235_1$,$235_2$ to be made in substantially any useful position—it should however be noted that this positioning of the hollows is also possible in the previous embodiment, in which case the shape and/or size of the fins $110_{F1}$,$110_{F2}$ could correspondingly differ from the one shown.

As previously mentioned, the extension for substantially the whole length of the plate 210 is advantageous in that it allows increasing the reliability of the coupling of the plate 210 to the link body 215: for this purpose, preferably, the coupling elements further comprise one or more (for example, two) teeth $210_{F1T}$,$210_{F2T}$ (preferably provided each one in a respective wall $210_{F1}$,$210_{F2}$) each one adapted to be inserted, for example by friction or by snap fit, within a respective hollow $255_{H1}$,$255_{H2}$ (each one preferably provided in a corresponding wing element $255_1$,$255_2$). Preferably, as illustrated, each tooth $210_{F1T}$,$210_{F2T}$ extends along the vertical direction Y and protrudes from a lower edge of the respective wall $210_{F1}$,$210_{F2}$ (i.e. the edge that, in use, faces the guide of the article conveyor), and each hollow $225_{H1}$,$225_{H2}$ extends along the vertical direction Y within the respective wing element $255_1$,$255_2$ between an upper surface and a lower surface thereof.

The coupling between the teeth $210_{F1T}$,$210_{F2T}$ and the hollows $225_{H1}$,$225_{H2}$ confers further stability to the chain 200, in particular it stabilizes the plate 210 in a curve.

Preferably, as shown in FIGS. 2A, 2B, 2G and 2H, the plate 210 has, in plan view, a substantially rectangular shape, with the exception of an appendix 245 and a recess 250 (preferably structurally and functionally similar to the appendix 145 and the recess 150 of the plate 110).

In particular, similar to the appendix 145, the appendix 245 preferably comprises an upper surface $AS_{245}$ (preferably similar to the upper surface $AS_{145}$) and a tongue portion $245_T$. This tongue portion $245_T$ is advantageously able to be inserted in a seat (not visible) of the rear hinging region 230, so that, by inserting the tongue portion $245_T$ inside the seat and pushing down the plate 210, the plate 210 is guided in rotation towards the link body 215 (with the tongue portion $245_T$ acting as a fulcrum) up to the engagement of the projections $235_1$,$235_2$ with the respective hollows $240_1$, $240_2$, and, hence, down to the resting of the plate 210 on the respective crosspiece $215_T$ (the crosspiece $215_T$ and the seat in the rear hinging region 230 thus supporting the plate 210 at its front and rear sides, respectively).

Figure 2E:
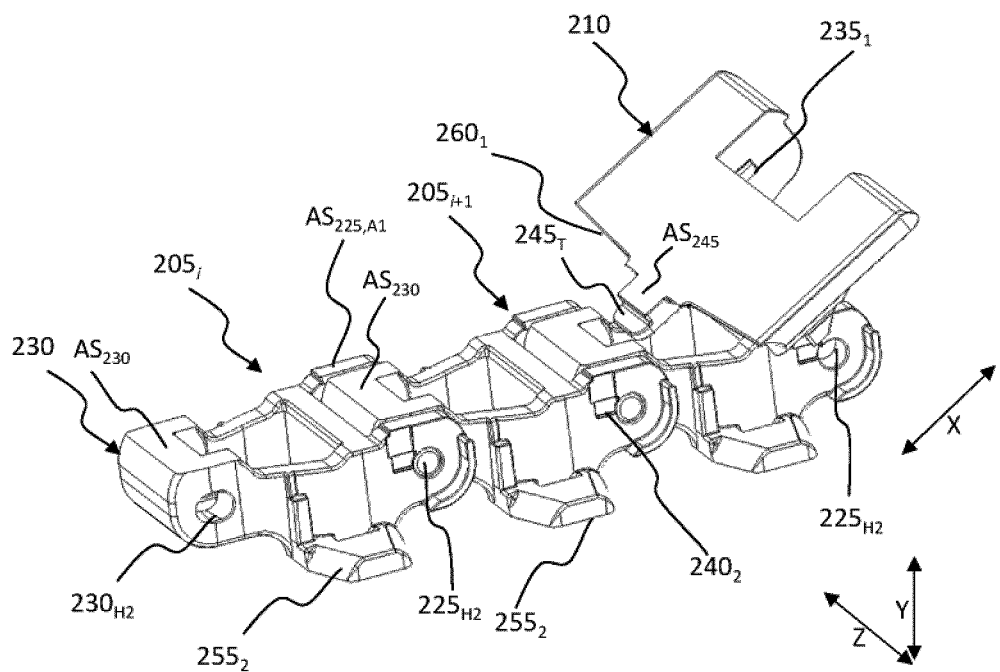
Figure 2F:
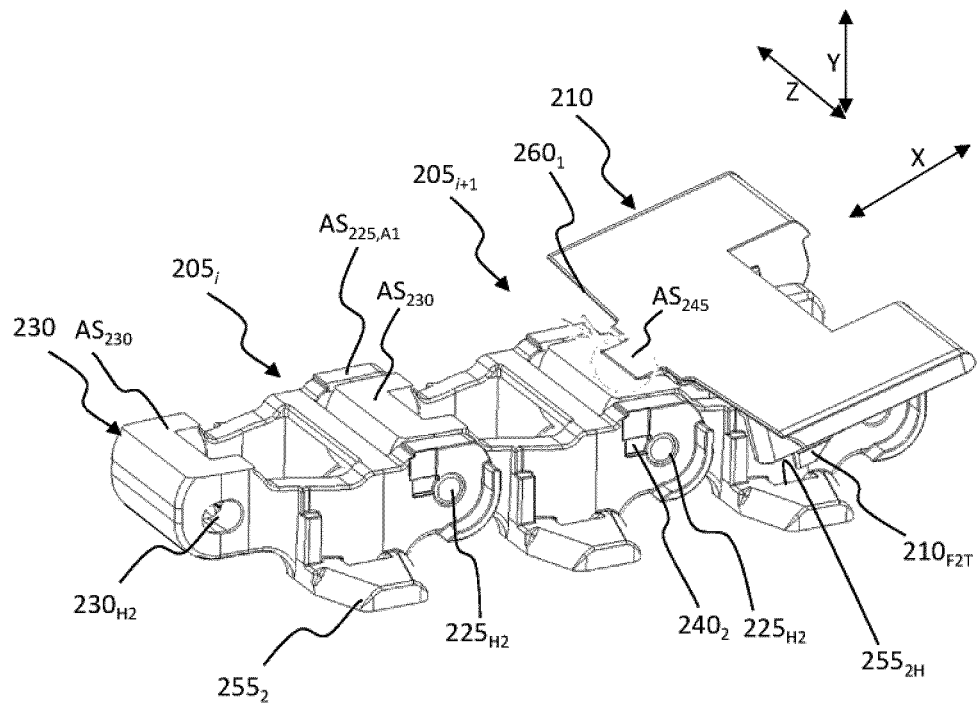
Figure 2H:
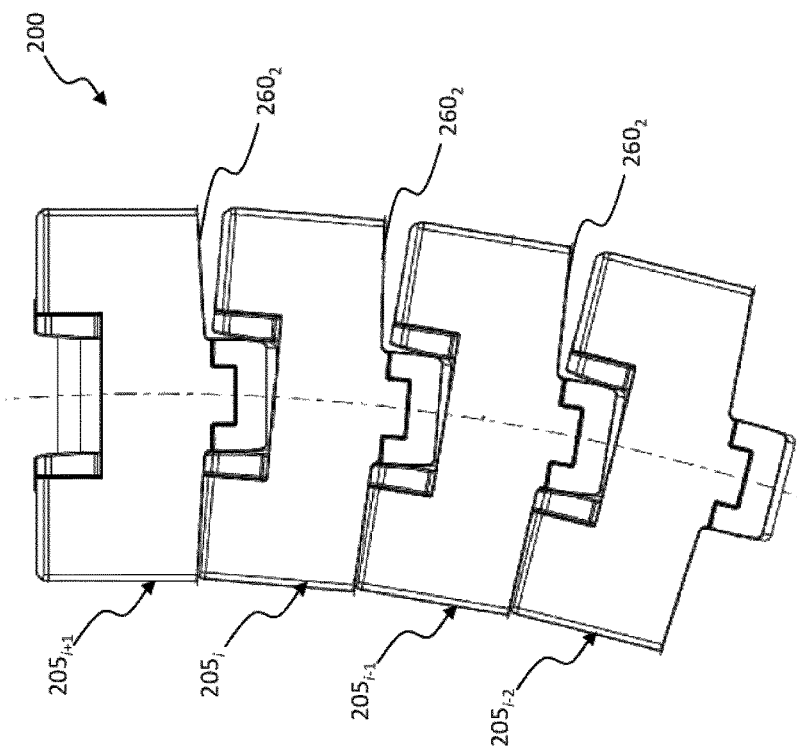
FIG. 2H shows a top view of the portion of the chain of FIG. 2A in a curved condition, according to an embodiment of the present invention.
Figure 2G:
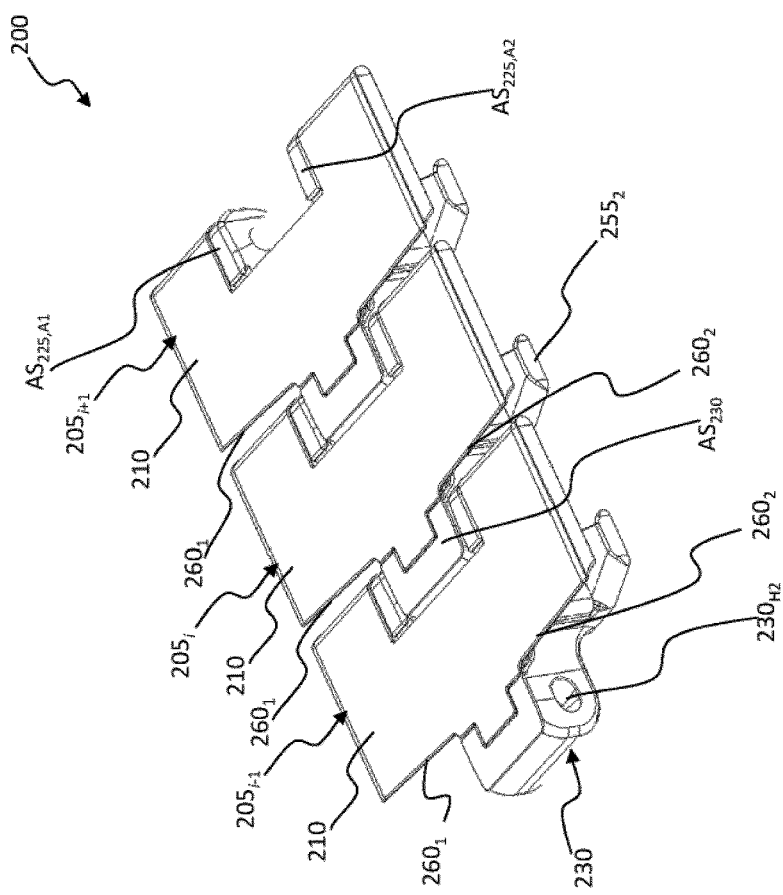

As can be seen in FIGS. 2E and 2F, when the plate 210 is coupled to the link body 215, the upper surface $AS_{245}$ of the appendix 245 of the link $205_i$ fits into the recess of the upper surface $AS_{230}$ of the rear hinging region 230 of the link $205_i$, and the upper surface $AS_{225,A1}$,$AS_{225,A2}$ of the front hinging region 225 of the link $205_i$ defines, with the upper surface $AS_{230}$ of the rear hinging region 230 of the following link $205_{i+1}$ and with the upper surface $AS_{245}$ of the appendix 245 of the plate 210 of the subsequent link $205_{i+1}$, a substantially continuous surface (which forms the portion of support surface associated with the link $205_i$). However, similarly to what has been discussed above in connection with the upper surfaces $AS_{125,A1}$,$AS_{125,A2}$,$AS_{130}$,$AS_{145}$, the sizes of the upper surfaces $AS_{225,A1}$,$AS_{225,A2}$,$AS_{230}$,$AS_{245}$ are preferably minimized in the design phase with respect to the size of the upper surface of the plate 210 (so as to obtain the same advantageous effects discussed above).

Unlike the plate 110 (in which the rear side is substantially straight, exception made for the presence of the appendix 245), the plate 210 preferably comprises a rear side with a substantially V-shaped profile (which, as will be clarified shortly, allows the chain rotation 200). As better visible in FIGS. 2A and 2E-2G, the rear side of the plate 210 preferably comprises two slanted portions $260_1$,$260_2$ extending from respective sides of the appendix 245 with opposite slanting, so as to define, along the longitudinal direction X, respective gaps progressively more extended between the rear side of the link $205_i$ and the front side of the previous link $205_{i-1}$. In this way, as shown in FIG. 2H, these gaps allow the chain 200 to rotate rightwards and leftwards (it should be noted that in the absence of such gaps the plate would hinder rotation). The progressive extension of the gaps along the longitudinal direction X allows the chain 200 to rotate while maintaining the supporting surface as continuous as possible: in any case, embodiments of the present invention (not shown) may provide rear sides of the plates which define constant or substantially constant gaps along the horizontal direction X (such embodiments may be provided, for example, in the case of articles of relatively large sizes to be conveyed and/or in the case of articles that are shaped so as not to incur the risk of being trapped within such gaps).

Figure 3A:
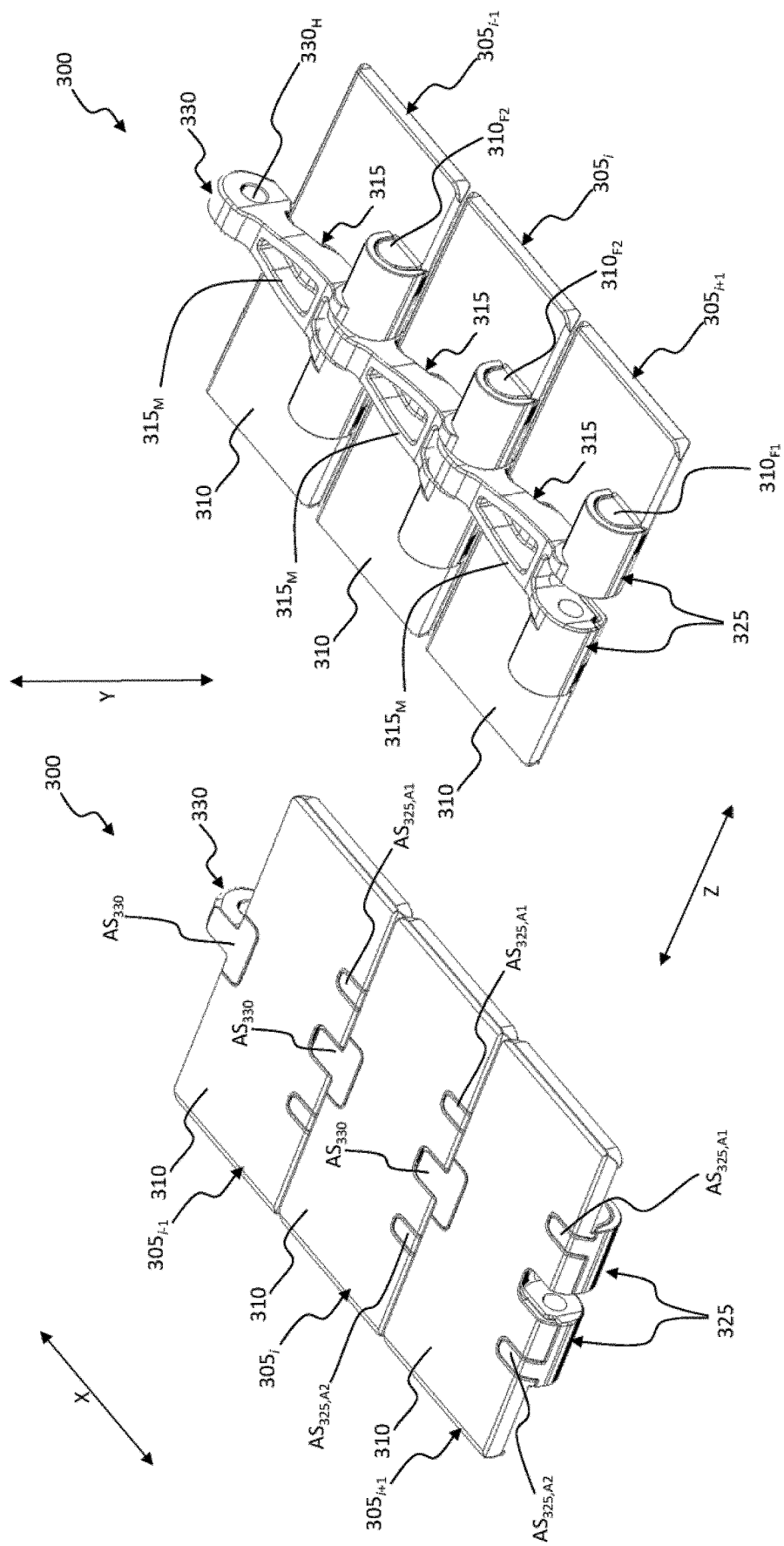
FIG. 3A shows perspective views of a portion of a chain for an article conveyor according to another embodiment of the present invention.

With reference now to FIG. 3A, it shows perspective views of a chain 300 (or of a portion thereof) for an article conveyor according to another embodiment of the present invention, the chain 300 being shown in such a figure in the operative orientation (drawing on the left) and in the upside-down orientation (drawing on the right). In the following, for ease of description, FIG. 3A will be discussed jointly with FIG. 3B, which shows perspective exploded views of a link $305_i$ of the chain 300 in the operative orientation (drawing on the left) and in the upside-down orientation (drawing on the right), and to FIGS. 3C-3G, which show perspective views of the chain 300 in respective mounting phases.

In the following, elements of the chain 300 and/or of the link $305_i$ corresponding to those of the chains and/or of the links of the previous embodiments will be indicated by similar number references, and their description will be simplified or omitted for the sake of description conciseness. It should be noted that, analogously to the chain 200 illustrated in FIG. 2A, the chain 300 is rotated by 180° on the X-Z plane with respect to the chain 100.

Similarly to the above, each link $305_i$ has a first link element (a plate, in the illustrated example) 310 for supporting the articles to be conveyed, and a second link element (a link body, in the illustrated example) 315, preferably coupleable in a reversible manner to the plate 310, for supporting the plate 310 and for allowing the movement of the chain 300, with each link $305_i$ that is adapted to be hinged to the link adjacent thereto $305_{i-1}, 305_{i+1}$ (i.e., to the following link $305_{i+1}$ and/or to the previous link $305_{i-1}$) by means of a respective hinging pin 320 (for example, along the transverse direction Z).

Preferably, as illustrated, the link body 315 of each link $305_i$ comprises a front hinging region 325 for hinging the link $305_i$ to the following link $305_{i+1}$, and a rear hinging region 330 for hinging the link $305_i$ to the previous link $305_{i-1}$. Analogously to the above, the front hinging region 325 of each link $305_i$ is preferably adapted to receive the rear hinging region 330 of the respective following link $305_{i+1}$, with the front hinging region 325 of the link $305_i$ and the rear hinging region 330 of the respective following link $305_{i+1}$, properly aligned along the transverse direction Z, that are preferably adapted to receive at the same time a same hinging pin 320 (so as to obtain the hinging between the links).

Preferably, as illustrated, the link body 315 of each link $305_i$ comprises, on the bottom, a mounting region $315_M$ for the mounting thereon of the pinions and the cogwheels that allow the movement of the chain 300 (not shown), and, on the top, a support region $315_R$ (preferably, as illustrated, substantially flat) on which the plate 310 advantageously rests when it is coupled to the link body 315.

In the exemplary illustrated embodiment, the rear hinging region 330 comprises a hollow extremity $330_P$ (for example, cylindrical o substantially cylindrical), which protrudes from a rear end of the mounting region $315_M$ along the longitudinal direction X, and has a through hole $330_H$ (determining the hollow of the cylindrical extremity), or other hollow, adapted to receive the hinging pin 320 along the transverse direction Z. As visible in the figures, such extremity $330_P$ also protrudes along the vertical direction Y, thus delimiting from behind, in height, the support region $315_R$.

In the exemplary illustrated embodiment, the front hinging region 325 comprises, at a front end of the mounting region $315_M$ (opposite to its rear end), a pair of hollow arms $325_1, 325_2$ extending along the transverse direction Z and having respective through holes $325_{H1}, 325_{H2}$ (which determine the hollows of the respective arms $325_1, 325_2$), or other hollows, adapted to receive the hinging pin 320 along the transverse direction Z.

Preferably, as illustrated, each arm $325_1, 325_2$ has, on the bottom, a cylindrical or substantially cylindrical surface (which can be better appreciated in the right drawings of FIGS. 3A e 3B). The cylindrical surface of each arm $325_1, 325_2$ advantageously extends along the transverse direction Z beyond the external opening of the respective through hole $325_{H1}, 325_{H2}$.

Preferably, as illustrated, each arm $325_1, 325_2$ has, on the top, a flat surface substantially coplanar to the support region $315_R$ for receiving the plate 310 (as discussed in the following), and an edge portion $325_{1E}, 325_{2E}$ advantageously protruding, along the vertical direction Y, beyond the support region $315_R$ and delimiting, along the transverse direction Z, said flat surface (as discussed in the following, such edge portion $325_{1E}, 325_{2E}$, or a part thereof, advantageously acts as engaging element for coupling the plate 310 to the link 315). Each edge portion $325_{1E}, 325_{2E}$ advantageously extends along the transverse direction Z beyond the external opening of the respective through hole $325_{H1}, 325_{H2}$, preferably with an extent lower than that of the respective cylindrical surface (in this way, as will be understood in the following, when the plate 310 and the link body 315 couple to each other, the containment means of the plate 310, discussed in the following, are flush or substantially flush with the free ends of the cylindrical surfaces of the arms $325_1, 325_2$).

As mentioned above, in the exemplary illustrated embodiment, the extremity $330_P$ and the edge portions $325_{1E}, 325_{2E}$ protrude in height (along the vertical direction Y) beyond the support region $315_R$; as will be understood from the following discussion, the protrusions in height of the extremity $330_P$ and of the edge portions $325_{1E}, 325_{2E}$ are sized according to a width profile of the plate 310 (i.e., the profile of its extension along the vertical direction Y), so that, when the plate 310 is mounted on the link body 315, it defines a substantially flat upper surface of the link $305_i$.

Figure 3B:
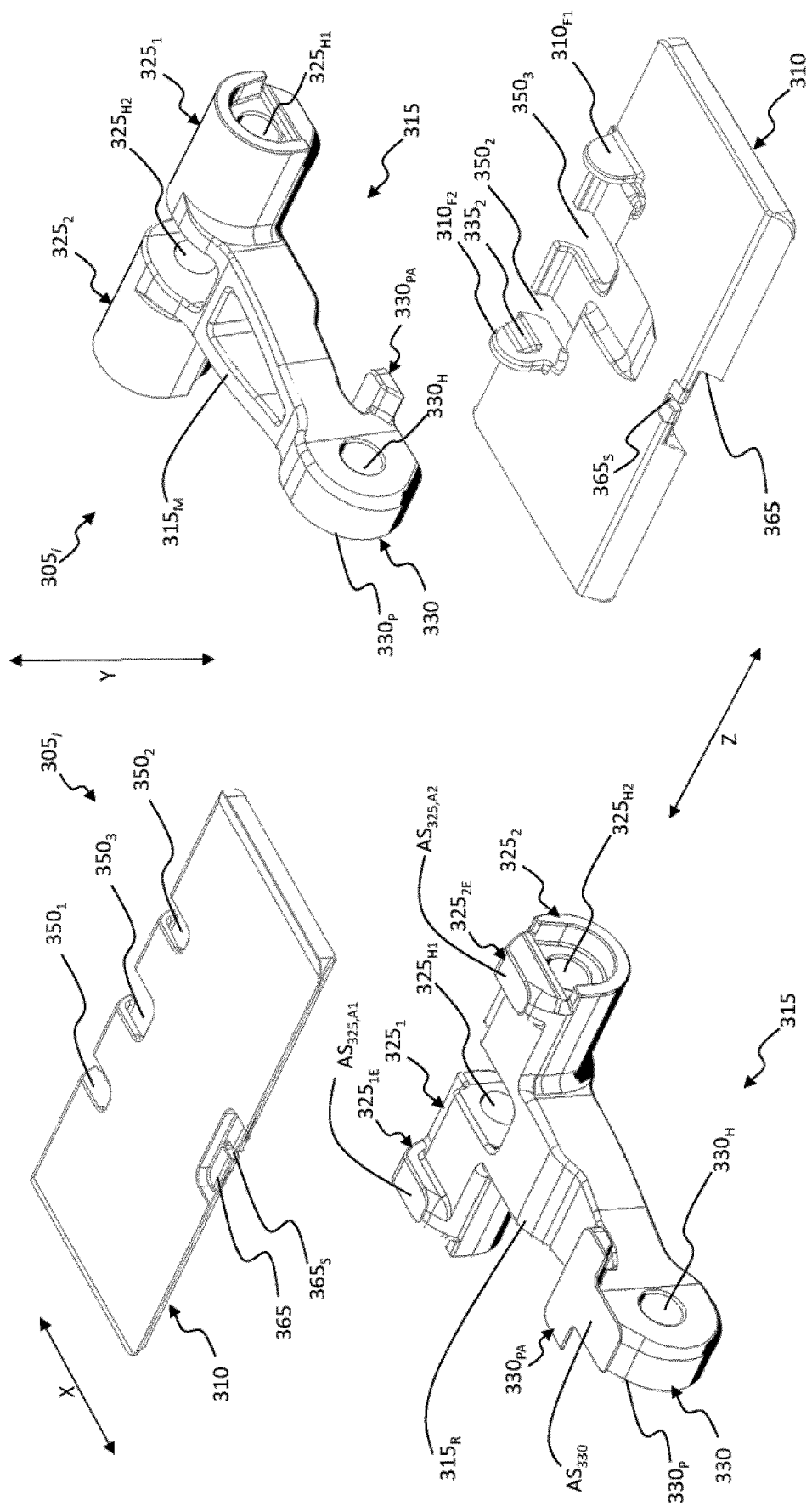
FIG. 3B shows perspective exploded views of a link of the chain of FIG. 3A according to an embodiment of the present invention.
Figure 3C:
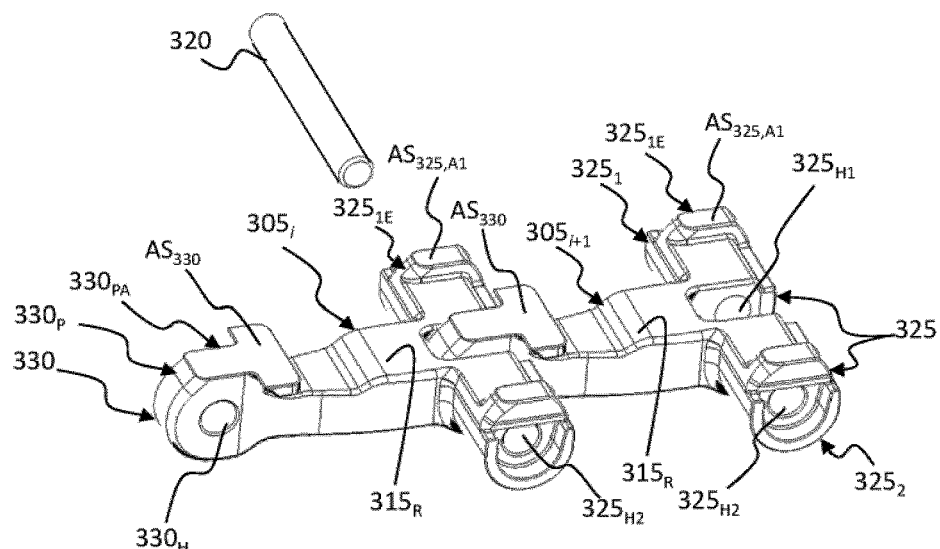
FIGS. 3C-3G show perspective views of the portion of the chain of FIG. 3A in respective mounting phases according to an embodiment of the present invention.
Figure 3D:
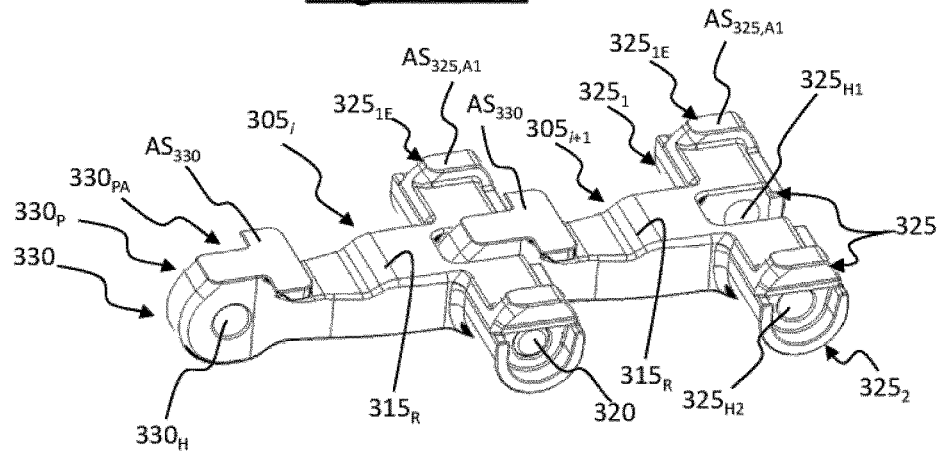
Figure 3E:
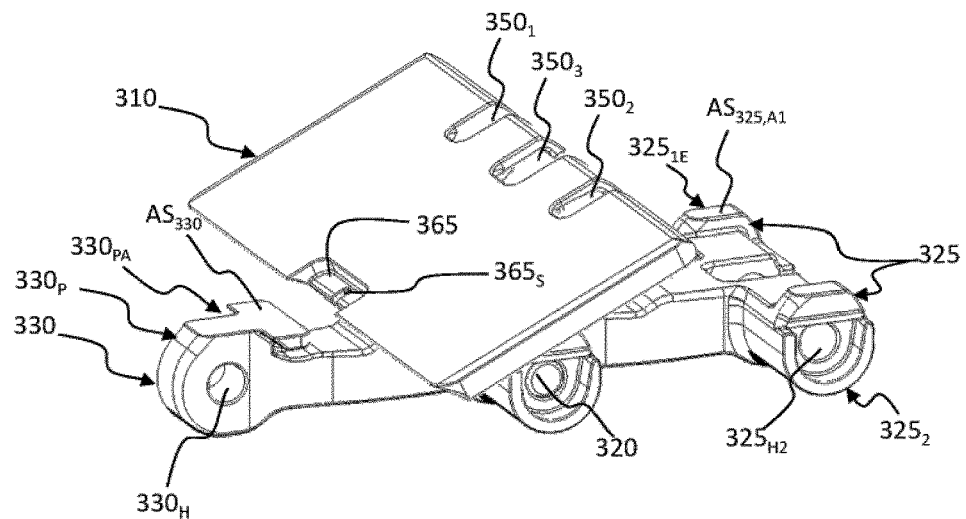
Figure 3F:
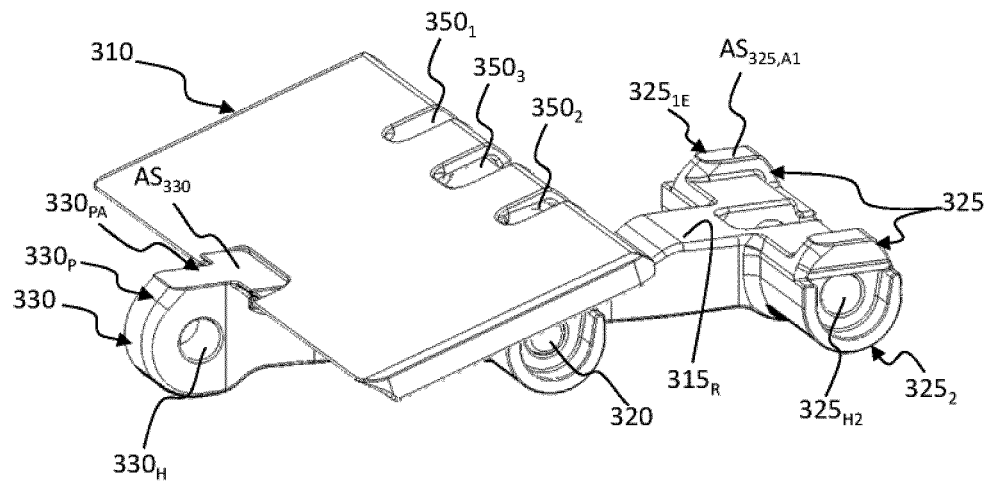

The arms $325_1, 325_2$ of each link $305_i$ are advantageously spaced apart along the transverse direction Z in such a way to receive therebetween the extremity $330_P$ of the rear hinging region 330 of the following link $305_{i+1}$ (so that the mutual alignment of the respective through holes $325_{H1}, 325_{H2}, 330_H$ along the transverse direction Z, and the insertion of the same hinging pin 320 through them, allows the hinging between the link body 315 of the link $305_i$ and the link body 315 of the following link $305_{i+1}$, as exemplary shown in FIGS. 3C and 3D).

In the exemplary illustrated embodiment, the through holes $325_{H1}, 325_{H2}, 330_H$ have a circular or substantially circular shape (so that the chain 300, analogously to the chain 100, is adapted to be used in rectilinear transportation paths, i.e. without curves), and are preferably made with diameters sufficiently larger than the diameter of the hinging pin 320 to allow the passage of the latter through them substantially without friction or with reduced friction (with extent and advantages of such friction that are analogous to those of the previous embodiments), but sufficiently small to constrain each link $305_i$ to rotate about a fixed rotation axis identified by the respective hinging pin 320 (as discussed above, the presence of a fixed rotation axis allows each link $305_i$ to flex with respect to the adjacent link $305_{i-1}, 305_{i+1}$ without misalignments).

Similarly to the previous embodiments, the front hinging region 325 has, in correspondence of the free end of each arm $325_1, 325_2$, a substantially flat upper surface $AS_{325,A1}$, $AS_{325,A2}$ (analogous to the upper surfaces $AS_{125,A1}, AS_{125,A2}$ e $AS_{225,A1}, AS_{225,A2}$ discussed in the foregoing) that, as will be clarified in the following, contributes to form the support surface of the chain 300, and the rear hinging region 330 has a substantially flat upper surface $AS_{330}$ that, as will be clarified in the following, contributes to form the support surface of the chain 300.

Preferably, as illustrated, the upper surface $AS_{325,A1}$, $AS_{325,A2}$ of the front hinging region 325 is preferably the upper surface of the edge portion $325_{1E}, 325_{2E}$ of the respective arm $325_1, 325_2$.

Preferably, as illustrated, the upper surface $AS_{330}$ of the rear hinging region 330 is preferably the upper surface of an upper appendix $330_{PA}$ of the extremity $330_P$ that, as discussed in the following, is advantageously provided for acting as alignment/positioning means and as fulcrum means for the coupling of the plate 310 to the respective link body 315. Such appendix $330_{PA}$ has a substantially T-shape profile, with a longitudinal portion (i.e., a portion extending along the longitudinal direction X) having substantially rectangular shape that covers the cylindrical extremity $330_P$ from above, and a transverse portion (i.e., a portion extending along the transverse direction Z) having substantially rectangular shape that protrudes beyond the longitudinal portion (towards the mounting region) along the longitudinal direction X (and that, as will be clarified in the following, forms a tongue advantageously functional to the coupling between the plate 310 and the link body 315).

Advantageously, in all the exemplary embodiments herein discussed, each link $105_i, 205_i, 305_i$ comprises a positioning element provided in the plate 110, 210, 310 and a positioning element provided in the link body 115, 215, 315 and adapted to couple to the positioning element provided in the plate 110, 210, 310 for aligning the plate 110, 210, 310 and the link body 115, 215, 315 to each other, with one of the positioning element provided in the plate 110, 210, 310 and the positioning element provided in the link body 115, 215, 315 that preferably acts as a fulcrum for guiding the coupling between the plate 110, 210, 310 and the link body 115, 215, 315 (see e.g. FIG. 1E-1G, FIG. 2E-2G, and FIG. 3E-3G).

Analogously to the above, each plate 310 comprises confinement means adapted to confine or contain the hinging pin 320 associated with the respective link $305_i$ within the front hinging region 325, thereby preventing the hinging pin 320 from escaping along the transverse direction Z (thus impairing the hinging between the links).

Analogously to the embodiment of FIGS. 1A-1G, such confinement means preferably comprises fins $310_{F1}, 310_{F2}$ (for example, two fins, each one being preferably associated with a respective through hole $325_{H1}, 325_{H2}$) extending from the bottom surface of each plate 310 along the vertical direction Y, each fin $310_{F1}, 310_{F2}$ being adapted to cover, when the plate 310 is coupled to the respective link body 315, a respective through hole $325_{H1}, 325_{H2}$ (in particular, its external opening). Preferably, the fins $310_{F1}, 310_{F2}$ are structurally analogous to the fins $110_{F1}, 110_{F2}$, whereby the previous considerations about the positioning of the fins $110_{F1}, 110_{F2}$ substantially flush with the external opening of the through hole and their distance along the transverse direction Z are valid also for the fins $310_{F1}, 310_{F2}$.

Analogously to the fins $110_{F1}, 110_{F2}$, the fins $310_{F1}, 310_{F2}$ are preferably made in a plastic material, more preferably they are made in a single piece with the respective plate 310 (for example, through injection molding techniques). Even more preferably, the fins $310_{F1}, 310_{F2}$ are made in a plastic material sufficiently rigid to allow the confinement of the hinging pin 320 without deformations, and sufficiently elastic to allow momentary deformations thereof (for example, in order to allow the coupling and decoupling between the plate 310 and the link body 315).

Similarly to the above, the coupling between the plate 310 and the link body 315 takes place by coupling between one or more coupling elements provided in the plate 310 and one or more coupling elements provided in the link body 315.

Similarly to the above, the coupling element(s) provided in the plate 310 and the coupling element(s) provided in the link body 315 are configured to lock to each other (hinging pin-free locking), preferably in a reversible (or releasable) manner, with the same advantageous effects of this hinging pin-free locking discussed in the previous embodiments that equivalently apply to the present embodiment.

Similarly to the previous embodiment, these coupling elements preferably comprise snap fit or snap coupling elements.

Preferably, as visible in FIG. 3B, such snap coupling elements comprise one or more projections preferably provided in the pate 310 and adapted to snap engage to one or more engaging elements preferably provided in the link body 315. More preferably, such snap coupling elements comprise two projections $335_1, 335_2$, each one associated with a respective fin $310_{F1}, 310_{F2}$ (and preferably formed in a respective inner surface thereof) and adapted to snap engage with a respective edge portion $325_{1E}, 325_{2E}$. Even more preferably, the projections $335_1, 335_2$ are analogous to the projections of the embodiments discussed in the foregoing, whereby they have same shape and similar coupling and decoupling modes; in this way, by sliding from top downwards of the plate 310 on the link body 305 (for example, in the manner illustrated in FIGS. 3E-3G), the projection $335_1, 335_2$ (due to the elastic deformation of the respective fin $310_{F1}, 310_{F2}$ caused by the solicitation determined by the sliding) slides along the external side of the edge portion $325_{1E}, 325_{2E}$ down to fitting underneath it (so that, when the solicitation ceases, the natural tendency of the fin $310_{F1}, 310_{F2}$ to elastically regain its original shape prevents the escape of the projection $335_1, 335_2$ by simple reverse sliding). Advantageously, analogously to the above discussion, in order to allow decoupling (disengaging) between the plate 310 and the link body 305, it is possible to apply a vertical on the plate 310 a vertical force from the bottom upwards; such a vertical force it in turn generates a flexing of the plate 310 which allows a momentary increase in the distance between the fins $310_{F1}, 310_{F2}$ at the same time, thus obtaining the disengagement of the projection $335_1, 335_2$ from the respective edge portion $325_{1E}, 325_{2E}$.

Preferably, as visible in FIGS. 3A, 3B and 3E-3G, the plate 310 has, in plan view, a substantially rectangular shape, exception made for three slots $350_1, 350_2, 350_3$ advantageously formed on the front side thereof and, preferably, and for a seat 365 advantageously formed on the rear side thereof.

Advantageously, each slot extends along the longitudinal direction X, preferably from the front side of the plate 310 towards the rear side thereof. More advantageously, the slots $350_1, 350_2$ are made with shapes, size and position corresponding to those of the upper surfaces $AS_{325\_A1}, AS_{325\_A2}$ associated with the front hinging region 325, whereas the slot $350_3$ is advantageously made with shape, size and position corresponding to those of the longitudinal portion of the appendix $330_{P4}$. In the exemplary illustrated embodiment in which the extremity $330_P$ (and hence the longitudinal portion of the appendix $330_{P4}$ associated therewith) is positioned, along the transverse direction Z, substantially centrally with respect to the arms $325_1, 325_2$, the slot $350_3$ is correspondingly positioned, along the transverse direction Z substantially centrally with respect to the slots $350_1, 350_2$.

The seat 365 is advantageously made with shape, size and position corresponding to those of the transverse portion of the appendix $330_{P4}$, so as to receive the latter to allow the coupling between the plate 320 and the link body 315. More advantageously, the seat 365 further comprises a slit $365_S$ adapted to receive a centering member (not shown) preferably provided underneath the transverse portion of the appendix $330_{P4}$. More particularly, by aligning the transverse portion of the appendix $330_{P4}$ to the seat 365 of the plate 310 and by inserting the centering member into the slit $365_S$, the pushing of the plate 310 downwards determines the rotation of the plate 310 towards the link body 315 (with the coupling between the centering member and the slit $365_S$ that therefore acts as fulcrum) down to the engagement of the projections $335_1, 335_2$ with the respective edge portions $325_{1E}, 325_{2E}$ and to the resting of the transverse portion of the appendix $330_{P4}$ within the respective seat 365 (as visible in FIGS. 3F and 3G).

Figure 3G:
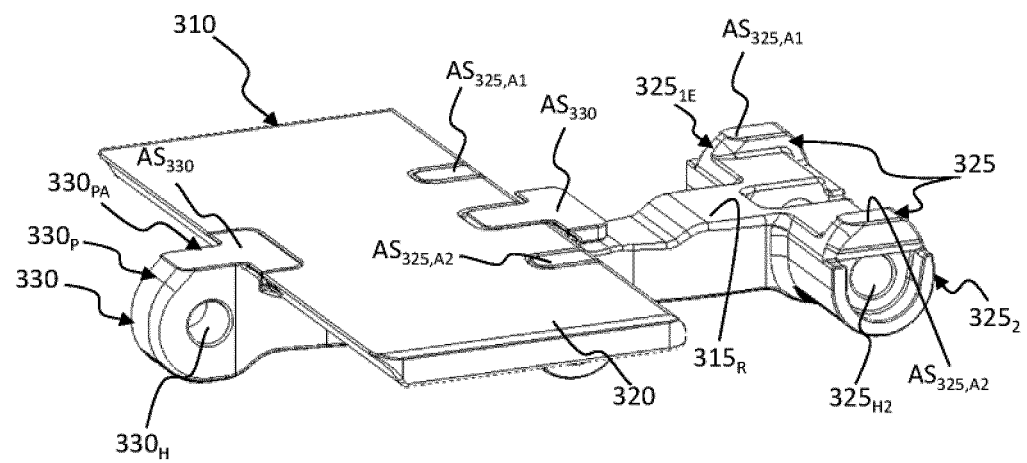

In this way, as can be better appreciated in FIG. 3G, when the plate 310 is coupled to the link body 315, and rests on the support region $315_R$, the upper surfaces $AS_{325\_A1}, AS_{325\_A2}$ associated with the front hinging region 325 of the link $305_i$ fit in the slots $350_1, 350_2$ of the plate 310 associated with the same link $305_i$, the transverse portion of the appendix $330_{P4}$ associated with the rear hinging region 330 of the same link $305_i$ fits within the seat 365, and the longitudinal portion of the appendix $330_{P4}$ associated with the rear hinging region 330 of the following link $305_{i+1}$ fits within the slot $350_3$, thereby obtaining a substantially continuous surface that forms the portion of the resting surface of the chain 300 associated with the link $305_i$—as mentioned in the foregoing, in order to achieve it, the protrusions in height of the extremity $330_P$ and of the edge portions $325_{1E}, 325_{2E}$ are advantageously sized according to a width profile of the plate 310. Analogously to the previous discussion about the upper surfaces $AS_{125\_A1}, AS_{125\_A2}, AS_{130}$ and $AS_{225\_A1}, AS_{225\_A2}, AS_{230}$, the sizes of the upper surfaces $AS_{325\_A1}, AS_{325\_A2}, AS_{330}$ are preferably minimized during the design phase with respect to the size of the upper surface of the plate 310 (so as to obtain the same advantageous effects discussed above).

Naturally, in order to satisfy contingent and specific requirements, a person skilled in the art may introduce in the present invention many modifications and logical and/or physical changes. More specifically, although the present invention has been described with a certain level of detail with reference to one or more embodiments thereof, it should be understood that various omissions, substitutions and changes in the form and details as well as other embodiments are possible. In particular, various embodiments of the present invention may be put into practice even without the specific details (such as the numerical examples) set forth in the description to provide a more complete understanding thereof; on the contrary, well-known features may be omitted or simplified in order not to obscure the description with unnecessary details. Moreover, it is expressly intended that specific elements described in relation to each embodiment of the present invention may be incorporated in any other embodiment as a normal design choice.

Similar considerations apply if the link has a different structure or comprises equivalent components. In any case, any component may be separated into more elements, or two or more components may be combined into a single element; furthermore, each component may be replicated to support the execution of the corresponding operations in parallel. It is also pointed out that (unless otherwise specified) any interaction between different components generally does not need to be continuous, and may be direct or indirect through one or more intermediaries.

The invention claimed is:

1. A link for a chain for an article conveyor, wherein said link comprises:
   a first link element and a second link element formed as coupleable separate parts, the first link element being configured to support articles to be conveyed, and the second link element being adapted to support the first link element and to allow the chain to be moved when in use in the article conveyor;
   a hinging region provided in the second link element for hinging said link to a further link of the chain, said hinging region being adapted to the insertion within it of a hinging element along an insertion direction for hinging the link to another link of the chain,
confining means provided in the first link element and adapted, when the first link element is coupled to the second link element, to confine said hinging element within the hinging region along the insertion direction, thereby preventing the hinging element to escape from said hinging region along the insertion direction; and
coupling means for coupling the first link element and the second link element to each other, and comprising a first coupling element provided in said confining means, and a second coupling element provided in the second link element and adapted to be coupled to the first coupling element, the first and second coupling elements being configured to lock to each other, in particular such that a hinging element-free coupling between the first and the second link elements is obtained.

2. A link according to claim 1, wherein the first link element comprises a first surface adapted to support the articles to be conveyed and a second surface opposite the first surface, said confining means comprising at least one wall extending from the second surface of the first link element towards the hinging region.

3. A link according to claim 1, wherein the hinging region comprises at least one hollow adapted to receive the hinging element, said confining means being adapted to cover said at least one hollow so as to prevent the hinging element within the at least one hollow from escaping along the insertion direction.

4. A link according to claim 1, wherein the first link element and the second link element are configured to be coupleable to each other in a reversible manner.

5. A link according to claim 1, wherein said coupling means comprises snap coupling means for snap coupling the first link element and the second link element to each other.

6. A link according to claim 1, comprising the first coupling element provided in a portion of said confining means, and the second coupling element provided in a portion of the hinging region.

7. A link according to claim 1, further comprising positioning means adapted to align the first and second link elements to each other, and for guiding the coupling of the first and second link elements.

8. A link according to claim 7, wherein said positioning means comprises a first positioning element provided in the first link element and a second positioning element provided in the second link element and adapted to couple to the first positioning element.

9. A link according to claim 1, further comprising positioning means configured to act as a fulcrum for guiding the coupling between the first and second link elements during relative rotation between the first and second link elements to engage the first and second link elements together.

10. A link according to claim 1, further comprising a positioning means adapted as a fulcrum for guiding the rotational coupling between the first and second link elements as the first and second link elements are engaged with each other.

11. A link according to claim 10, wherein said positioning means comprises a tongue portion and a seat that cooperate to guide during rotation the first and second link elements into engagement.

12. A link according to claim 11, wherein the first link element defines the tongue portion and the second link element defines the seat.

13. A link according to claim 10, wherein said positioning means comprises a slit and a centering member that cooperate to align the first and second link elements into engagement during relative rotation between the first and second link elements.

14. A link according to claim 1, further comprising positioning means adapted as a fulcrum for coupling the first and second link elements.

15. A link according to claim 1, further comprising positioning means adapted for rotatably guiding the coupling between the first and second link elements as the first and second link elements are coupled.

\* \* \* \* \*